(12) United States Patent
Balandier et al.

(10) Patent No.: US 11,828,227 B2
(45) Date of Patent: Nov. 28, 2023

(54) AIRCRAFT POWERPLANT COMPRISING A RECUPERATIVE CLOSED-CYCLE ARRANGEMENT

(71) Applicants: ITP ENGINES UK LTD, Whetstone (GB); AVL POWERTRAIN UK LTD, Basildon (GB)

(72) Inventors: Quentin Luc Balandier, Leicester (GB); Florin Gabriel Aftanasa, Coventry (GB); Xiang Wang, Solihull (GB)

(73) Assignees: ITP ENGINES UK LTD, Whetstone (GB); AVL POWERTRAIN UK LTD, Basildon (GB)

( * ) Notice: Subject to any disclaimer, the term of this patent is extended or adjusted under 35 U.S.C. 154(b) by 0 days.

(21) Appl. No.: 17/654,985

(22) Filed: Mar. 15, 2022

(65) Prior Publication Data
US 2022/0298967 A1    Sep. 22, 2022

(30) Foreign Application Priority Data
Mar. 17, 2021   (EP) .................................... 21163092

(51) Int. Cl.
*F02C 6/18*     (2006.01)
*F01K 23/10*   (2006.01)
(Continued)

(52) U.S. Cl.
CPC ............... *F02C 6/18* (2013.01); *F01K 23/10* (2013.01); *F02C 1/005* (2013.01); *F02C 1/10* (2013.01); *F05D 2260/213* (2013.01)

(58) Field of Classification Search
CPC .... F02C 6/18; F02C 1/005; F02C 1/10; F01K 23/10; F05D 2260/213
See application file for complete search history.

(56) References Cited

U.S. PATENT DOCUMENTS 9,163,827 B2 * 10/2015 Wilson ...................... F02C 6/18
10,215,097 B2 * 2/2019 Miller ....................... F02C 7/14
(Continued)

FOREIGN PATENT DOCUMENTS

EP    3623296 A1    3/2020

OTHER PUBLICATIONS

Extended European Search Report for European Patent Application No. 21163092.6, dated Aug. 31, 2021, in 5 pages.

*Primary Examiner* — Jesse S Bogue
(74) *Attorney, Agent, or Firm* — Knobbe, Martens, Olson & Bear, LLP

(57) ABSTRACT

The disclosure provides a powerplant for an aircraft comprising: at least two gas turbine engines, and at least one closed-cycle arrangement for recuperating heat from the at least two gas turbine engines and supplying power to at least one power-demanding system, wherein the closed-cycle arrangement comprises: a closed circuit channeling a working fluid subjected to a thermodynamic cycle; at least one pre-cooler configured to transfer heat from the working fluid to a heat sink; the heat sink in thermal communication with the pre-cooler, the heat sink being a fuel tank and/or an airframe surface; at least one pumping element configured to move the working fluid through the closed circuit; at least two primary heat exchangers, each one configured to transfer heat from a respective gas turbine engine to the working fluid; at least one expanding element configured to drive a gearbox and an output shaft by the expansion of the working fluid; wherein the output shaft driven by the expanding element is connected to at least one electrical generator configured to generate electrical power; a power conversion system configured to receive the generated electrical power by the electrical generator and to accommodate and supply it to the at least one power-demanding system; wherein the closed-cycle arrangement is adapted to be partially housed (Continued)

within the airframe structure of the aircraft, so that at least the pumping element, the expanding element, the electrical generator, and the power conversion system are housed in said airframe structure.

33 Claims, 13 Drawing Sheets

(51) Int. Cl.
*F02C 1/00* (2006.01)
*F02C 1/10* (2006.01)

(56) References Cited

U.S. PATENT DOCUMENTS

| | | | |
|---|---|---|---|
| 10,676,205 B2* | 6/2020 | Niergarth | F01D 15/12 |
| 11,167,854 B2* | 11/2021 | Casado-Montero | B64D 33/02 |
| 11,492,970 B2* | 11/2022 | Rambo | F02C 3/22 |
| 11,560,239 B2* | 1/2023 | Rambo | B64D 37/34 |
| 2010/0257837 A1* | 10/2010 | Schroder | F01K 13/02 |
| | | | 60/39.15 |
| 2016/0326961 A1* | 11/2016 | Tomita | F01K 9/003 |
| 2019/0249599 A1 | 8/2019 | Sen et al. | |
| 2020/0224589 A1 | 7/2020 | McAuliffe et al. | |

* cited by examiner

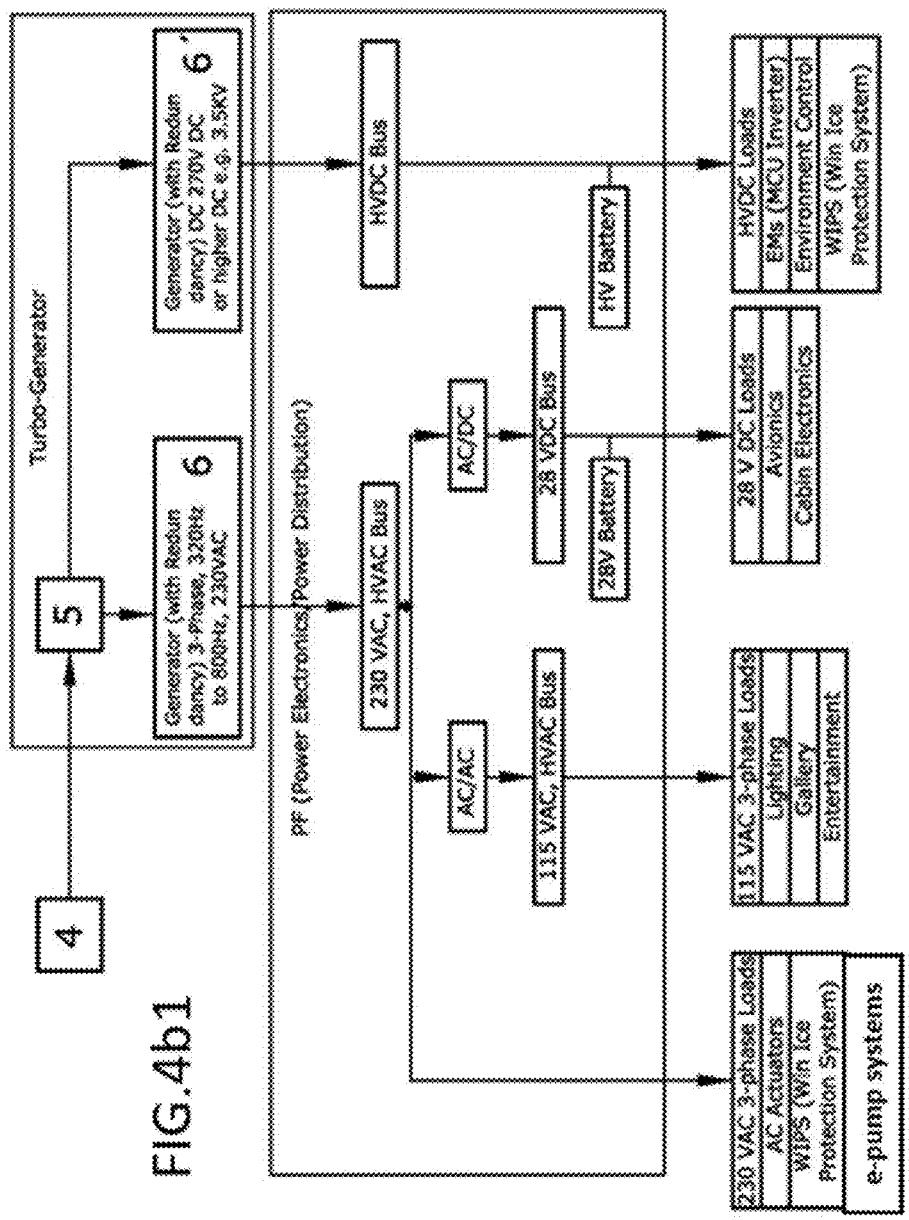
FIG.4b1

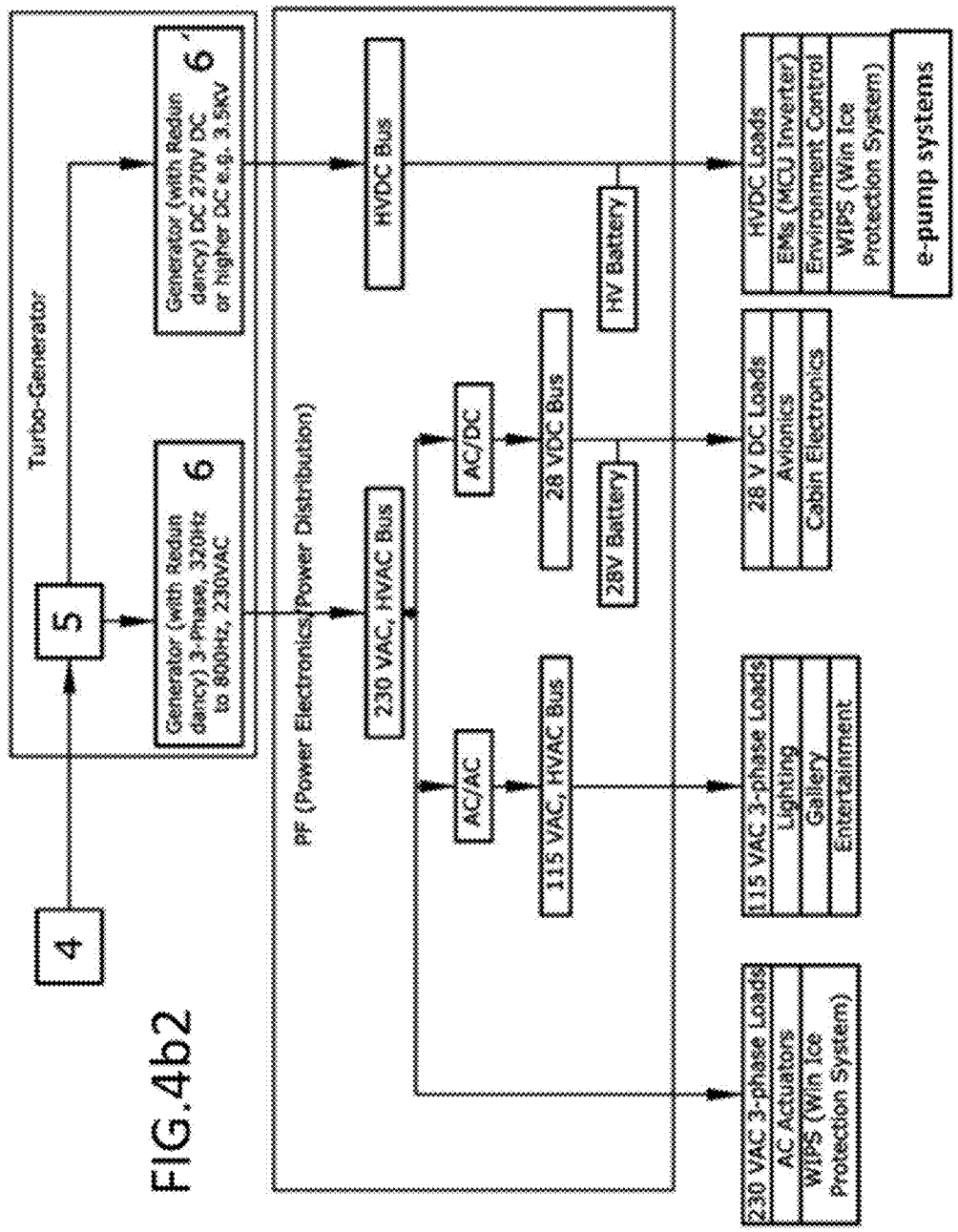
FIG.4b2

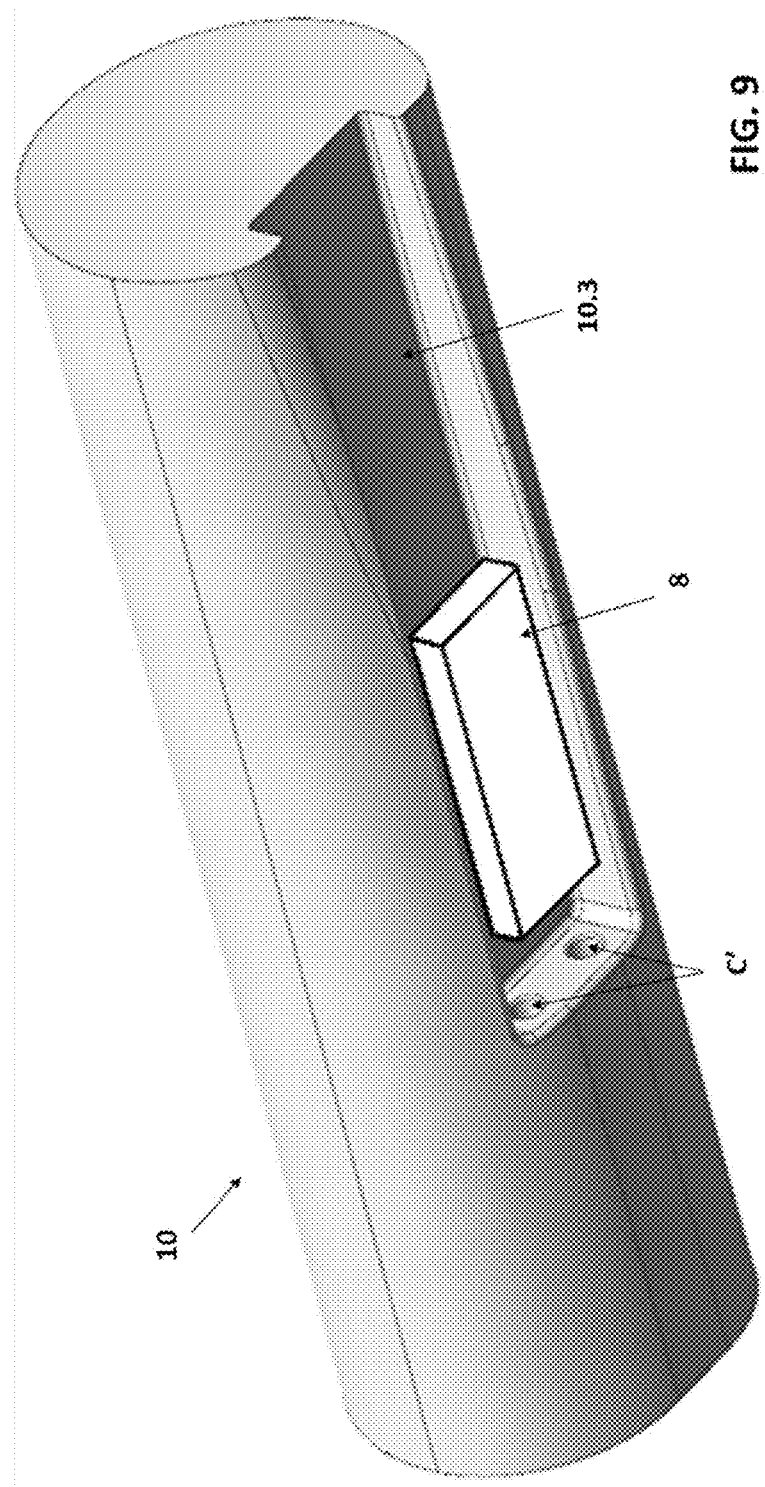

AIRCRAFT POWERPLANT COMPRISING A RECUPERATIVE CLOSED-CYCLE ARRANGEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure belongs to the field of aircraft powerplants. Particularly, it relates to a new powerplant configuration providing a closed cycle arrangement in combination with at least two aero gas turbine engines.

The closed-cycle arrangement recuperates heat from the aero gas turbine engines and let power-demanding systems be supplied with power. In advantageous embodiments, the closed-cycle further comprises an additional heat or mechanical source to boost the power extracted.

This closed-cycle arrangement is the basis of a new power distribution across the aircraft with high power levels being shifted from the engines position to the aircraft fuselage or belly fairing position. Furthermore, couplings of the closed-cycle arrangement with the gas turbine engines, auxiliary power generating systems, power conversion systems, fuel and energy storage systems and couplings with aircraft interfaces are compounded to improve the efficiency of the powerplant.

BACKGROUND

Single-aisle and double-aisle civil aircrafts typically have two or four engines mounted on the wings pylons. Some aircrafts in the lower power range also use a third engine added to the aircraft tail.

The majority of civil aircraft engines are either turbofans or turboprops gas turbine engines. They produce two main airflows: a cold bypass airflow for propulsion and a hot airflow, produced by the engine core, generating power to drive the propulsive fan or propeller. Recent high bypass turbofan engines typically achieve take-off thrust ratings of 350 kN-500 kN.

The core of the engine develops an open thermodynamic Brayton cycle. It comprises an air intake system, a compressor, a combustion chamber and a turbine driving the propulsive fan or propeller. Air is captured through the intake system. The compressor increases its pressure. The compressed air is mixed with fuel and this mixture is burnt in a combustion chamber. The hot combustion gases are expanded through the turbine. The blades and discs of the turbine convert the gases expansion into mechanical power driving the engine main shafts and, in turn, the propulsive fan or propeller. After passage through the turbine, the expanded gases are released to the atmosphere through a nozzle. Expanded gases are released at high temperature, with heat being wasted.

Several routes have been historically envisaged to limit emissions release and to improve the efficiency of the core engine (i.e. to reduce overall fuel consumption at a given engine rating).

First, the use of fuels with low carbon content has been considered to supersede kerosene and to limit emissions of the engine core. Such fuels generally require cryogenic storage and have a lower volumetric energy density than kerosene preventing easy application for aircraft propulsion.

For instance, methane-based fuels, such as Liquid Natural Gas (LNG) or Liquid Bio-Methane (LBM), have a volumetric energy density lower but comparable to the energy density of kerosene. Their use in an aircraft application would require similar tank volumes than in current aircraft configurations.

On the other hand, fuels without carbon such as Liquid Ammonia ($NH_3$) or Liquid Hydrogen ($LH_2$) have a significantly lower volumetric energy density, requiring much larger fuel tanks, and hence, a significant change to the current aircraft configuration (incl. wing concept). They further require a new ground infrastructure for fuel storage and supply, whereas methane-based fuels may be stored in the currently available infrastructure.

Overall, fuel change from kerosene to low carbon fuels, especially Liquid Hydrogen, has major impacts to the aircraft structure, ground infrastructure and fuel supply chain.

Second, efficiency gains of the core engine have been achieved by increasing the Compressor Pressure Ratio ('CPR'), the Turbine Entry Temperature ('TET') and individual component efficiencies, obtained by improvements in components aerodynamics and resistance to high temperatures through the application of protective coatings or local component cooling optimization for example. However, efficiency gains through CPR, TET or components efficiencies improvements are now marginal, mainly due to materials limitations at high temperatures.

Third, in addition to the direct improvements provided through primary gas path gains, continuous optimization of the engine sub-systems has been implemented to provide an indirect increase of the engine efficiency. Such sub-systems can be:

Systems enabling transient performance,
Secondary cooling systems, and
Power offtake from engine core shafts.

Regarding the systems for transient performance, the gas turbine engine operates at steady state during the main phase of the flight (i.e. cruise). The performance at this design point dictates the overall fuel consumption of the aircraft. Transient phases (such as take-off, climb, approach, landing), while shorter than the cruise phase, have a significant impact to the fuel consumption.

Transient performance requires complex design modifications of the engine to operate off-design point. The main requirement is the protection of the compressor against stall and surge, leading to complex and large compressors bleed systems. Transient performance also requires the design of components for higher shaft speeds and peak temperatures than during cruise. A small increase in shaft speed significantly reduces component life. It may also expose the component to its temperature or creep limit or to aerodynamic flutter for example. As a result, design for transient performance leads to strong penalties to the engine design.

Regarding cooling systems, compressed air from the compressor is used as a coolant of the engine hot sections. It directly cools the combustor and the turbine components exposed to the hot gas path. Compressed air is also used to cool the external surfaces of the turbine casings to minimize turbine blade tip clearance. This control has a great impact to the turbine efficiency for both steady state and transient operation. However, this air-based system requires large manifolds, with a high number of perforations, projecting air to the casings in a non-optimal open loop way. Due to the limitations of this system, air is only projected to a limited casing section above the blades tip, preventing a good control of the overall casing deflection with temperature.

Finally, regarding power-offtake from engine core shafts, the shafts of the engine core have complex gearboxes allowing engine cranking and power off-take directed to both the aircraft and engine systems. Integration of such complex gearboxes within the engine core is highly difficult. Due to the level of complexity and space constraints, the level of power extracted is relatively low in comparison to the total engine shaft power. Typically, for a Civil Large engine, with take-off thrust rating of 350 kN, power offtake through engine main shaft gearboxes is lower than 0.8 MW. Furthermore, downstream power transmission from the shafts gearbox is done through an accessory gearbox. The accessory gearbox drives—through a serie of gears—low power demanding accessories such as: engine fuel pumps, oil pump, hydraulic pump, centrifugal breather, starter, low power electrical generator. The accessory gearbox is mounted on the engine external casings and produces a significant penalty to the engine nacelle aerodynamics. Overall, power-offtake from the engine shaft imposes further significant negative constraints to the engine design.

As stated, current aircraft engines cores are already highly optimized rendering little margins for improvements. Nevertheless, engines are still compromised by wasted heat and non-optimum sub-systems.

Document US 2019/0249599 A1 describes an alternative engine-level architecture based on a recuperative solution where the engine by-pass flow is used a heat sink and power recovered is mechanically reverted to the engine using drivetrains and gearboxes. Among others, this solution requires the additional components to be located within the diameter of the engine fan casing and more specifically, close to the engine shafts to allow power transmission through mechanical means. As a consequence, integration problems —including thermal management of the electrical machine and electronics—and size limitation occur, with very low power ratings being reached by the recuperative cycle and the electrical machine relatively to the engine power rating. Besides, the confinement of additional elements within the current engine configuration entails a larger core impacting both by-pass flow and parasitic mass hanging from the wings, increasing the bending moment and stresses at the wing root.

Thus, there is a need in the industry for a new power-generation system with lower emissions and better efficiency, while being able to replace (or minimize) the gas turbine sub-systems previously listed.

SUMMARY

The present disclosure provides a solution for the aforementioned problems, by providing a powerplant for an aircraft according to claim 1 comprising a closed-cycle arrangement.

In dependent claims, preferred embodiments of the disclosure are disclosed.

In a first aspect, the disclosure provides a powerplant for an aircraft comprising:
at least two gas turbine engines, and
at least one closed-cycle arrangement for recuperating heat from the at least two gas turbine engines and supplying power to at least one power-demanding system, wherein the closed-cycle arrangement comprises:
a closed circuit channeling a working fluid subjected to a thermodynamic cycle;
at least one pre-cooler configured to transfer heat from the working fluid to a heat sink;
the heat sink in thermal communication with the pre-cooler, the heat sink being a fuel tank and/or an airframe surface;
at least one pumping element configured to move the working fluid through the closed circuit;
at least two primary heat exchangers, each one configured to transfer heat from a respective gas turbine engine to the working fluid;
at least one expanding element configured to drive a gearbox and an output shaft by the expansion of the working fluid; wherein the output shaft driven by the expanding element is connected to at least one electrical generator configured to generate electrical power;
a power conversion system configured to receive the generated electrical power by the electrical generator and to accommodate and supply it to the at least one power-demanding system;
wherein the closed-cycle arrangement is adapted to be partially housed within the airframe structure of the aircraft, so that at least the pumping element, the expanding element, the electrical generator, and the power conversion system are housed in said airframe structure.

Throughout the entire description, a 'powerplant' should be understood as a functional group of elements in an aircraft, whose function is related to power generation. It comprises the aircraft gas turbine engines, auxiliary power generating systems, power conversion systems, the associated fuel system and energy storage systems.

In addition, throughout the entire description, a 'closed-cycle arrangement' shall be understood as a recuperative arrangement able to generate power from a heat source by means of a circulated working fluid, which undergoes a thermodynamic cycle as it passes through different stages. With the gas turbine cycles, it forms a combined cycle, significantly improving the efficiency of the aircraft powerplant.

The closed circuit comprises similar main loops, each one recovering heat from a different gas turbine engine by a separate primary heat exchanger. Nevertheless, some components are in common for the at least two circuits, rendering the architecture simpler. Preferably, highly reliable components are communalized between the two circuits entailing that, for instance, a common pumping element be used for the at least two primary heat exchangers.

As the powerplant according to the disclosure may relate to a twin engine aircraft or an aircraft with 3 off or 4 off engines configuration, the gas turbine engines position defines a middle or symmetry plane (i.e. 'middle section') matching the airframe middle plane (or 'middle section').

Throughout the entire description, 'airframe structure' shall be understood as the main structure of an aircraft comprising the fuselage, belly fairing, empennage or tail cone, and wings. The airframe structure is typically provided by airframe manufacturers, while the gas turbine engines are provided by engine manufacturers and integrated afterwards by airframe manufacturers. The conventional mechanical interface between the airframe structure and the engines is defined by the pylons, the pylons being part of the airframe structure.

According to the present disclosure, the airframe structure is adapted to carry part of the closed-cycle arrangement then being provided with all necessary supporting structures (e.g., fittings and brackets) for locating at least the pumping element(s), expanding element(s), intermediate heat exchanger (if any), electrical generator(s), and power conversion system within the airframe.

For the closed-cycle arrangement being able to replace conventional powering systems in engines rated at 350 kN-500 kN Take-Off Thrust, it should extract at least 1 MW from the engines and, therefore, relatively large components are necessary. Accordingly, and advantageously, the present disclosure discloses that the large components are preferably located at the powerplant middle section, matching the airframe middle section. In particular, having the common elements of the closed-cycle arrangement close to the airframe mid-section avoids inter alia bending moments in the wing roots caused by parasitic mass hanging from the pylons. In other words, 100 kg in the airframe structure mid-section has been found much more favorable than under the gas turbine engine pylon in terms of both aerodynamic performances and structural compromise.

Further, some elements of the close cycle are located in a portion of an airframe structure substantially proximate to the airframe fuselage undercarriage or belly fairing position, for instance, close to other pneumatic/hydraulic systems such as the Environmental Control System collaterally benefiting from the room adequateness in terms of volume, temperature and insulation.

As a result, the power conversion system of the present disclosure is close to the aircraft power demanding systems interfaces, reducing cable lengths.

Some hybrid-electric aircraft concepts rely on distributing the generated power by means of DC power transmission cables over long distances and high voltages, required to achieve significant power output. On the contrary, in the present description, the closed-cycle allows carrying high power levels (e.g., over 1 MW) over relatively large distances (e.g. over 1 m), within the airframe wings, fuselage and belly fairing in a safe manner. Then, short cables transport low power rates locally using a highly distributed electrical architecture using low voltages levels, as described later on, which makes the present architecture safer.

Specifically, the proposed configuration provides a new power distribution across the aircraft by transferring high power levels from the gas turbine engines to the airframe middle section. As a result, the engines sub-systems previously described become simpler and smaller, allowing better design and performance of the gas turbine engine.

Three different powerplant configurations are presented, each using the closed-cycle arrangement previously described:
  Closed power cycle
  Closed power cycle, with boost
  Closed power cycle, with boost and fuel cell coupling.

For each configuration, the basic configuration of the closed cycle arrangement is similar. Increasing level of couplings (in other words interactions) with the aircraft fuel system, energy storage systems, auxiliary power systems, power conversion systems and couplings with aircraft interfaces are also described. Such couplings improve the overall performance of the aircraft powerplant by cumulating compounding effects.

Preferably, the working fluid is carbon dioxide (CO2), natural gas or methane based (CH4), or an organic compound with high molar mass (for example, HCF125, R218, HFC134, $C_4F_8$), or ethanol or water. These working fluids may operate in a supercritical state, and/or with (gas↔liquid) phase changes or in a liquid form. These states allow managing high power levels with limited turbomachinery seize and limited piping seize, facilitating integration within the airframe.

Should the working fluid undergo complete (gas↔liquid) phases changes, condensation of the working fluid is made using a condenser positioned downstream of the expander(s).

In a preferred embodiment, the working fluid is supercritical carbon dioxide (s-CO2).

In another preferred embodiment, the working fluid is methane based.

In another preferred embodiment, the working fluid is an organic compound with high molar mass such as HCF125, R218, HFC134, $C_4F_8$.

In another preferred embodiment, the working fluid is ethanol.

In another preferred embodiment, the working fluid is water.

As known, distributing piping inside the airframe may come across with integration and thermal management issues and it can be provided with protective elements like pipe insulation, and/or air ventilation, and/or fuel cooling when conveying hot working fluid. In a particular embodiment, the pipes are made from a nickel-based alloy to prevent oxidation and corrosion issues from the hot working fluid, in conjunction with a ceramic insulation, applied in the form of tape.

Closed Power Cycle.

The basic configuration of this arrangement is that, the working fluid is pumped by a pumping element(s) that circulates the working fluid, toward each gas turbine engine to recuperate heat from a respective combustor section and/or turbine section and/or exhaust section of said gas turbine engine using a primary heat exchanger.

In a specific embodiment, where the working fluid is s-CO2, the fluid circulates at 45 kg/sec, with a pressure of around 100 bar for an engine rated at 350 kN-500 kN Take-Off Thrust.

As the skilled person shall understand, in case of the working fluid being a liquid or supercritical fluid, the pumping element may be embodied as a 'pump'. In case of the working fluid being a gas or supercritical fluid, the pumping element may be embodied as a 'compressor'. In the present description, the terms 'pumping element' or 'compressor element' refer to the component(s) circulating the working fluid in the close-cycle arrangement, by increasing the pressure of the working fluid. In this description, the term 'pumping element' is favored as the working fluid is preferably in a liquid or supercritical form.

After passage through the pre-cooler, and the pumping element, the cold working fluid exchanges heat with one or several of the following elements of the engine core: combustor walls, combustor and/or turbine casings, turbines nozzles guide vanes, turbines structures, and/or exhaust.

Preferably, this primary heat exchanger is arranged in such a way it does not impinge to the core gas path of the gas turbine engine. As a result, the gas velocities, especially the gas velocities at nozzle exit are not impacted by the heat exchangers, preventing a performance drawback, especially during transient phases of the flight cycle.

Preferably, this primary heat exchanger recuperates wasted heat from the combustor and/or turbine high pressure sections. As these sections are the hottest of the turbine, the level of heat recuperated through the closed-cycle is higher.

Unlike conventional engine arrangements, where compressed air is lead out from the compressors of the gas turbines engines to cool their respective combustors and turbines, in the present disclosure, the cold working fluid of the power cycle is applied to the previously air cooled surfaces of the combustor and turbines and acts as a coolant. Advantageously, as the coolant is now in a liquid or super-critical form, the heat transfer is much more effective than in the conventional arrangement using compressed air only. Heat transfers coefficients are improved at least by a factor of 5.

Furthermore, the coolant inlet temperature is also much lower than the temperature of the former high pressure, high temperature compressed air lead out from the last stages of the gas turbine compressor(s). For instance, in the conventional engine arrangement, the cooling of Pt stage turbine components is done using air from the last stage of the high pressure compressor. High pressure of the cooling air is required to prevent hot gas ingestion from the main gas path into the non-gas-path rotor cavities. Air temperature from the compressor last stage in recent engine is around 700° C. In the present disclosure, the coolant reaches the engine hot sections at a much lower temperature (<100° C.), further significantly improving the heat transfers of the combustor and/or turbine and/or exhaust components with the cooling fluid.

In turn, as component cooling is largely improved, significantly higher TET can be reached, with less or no cooling air required from the compressor. This further improves the efficiency of the Gas Turbine Brayton cycle on its own and the resulting efficiency of the combined cycle(s).

In a particular embodiment, the cooling of the turbine sections of the engine is essentially based on the cooling provided by the working fluid of the closed cycle arrangement, with cooling air consumed from the compressor entry mass flow being reduced. In this embodiment, less than 5% of compressor entry mass flow is consumed for cooling of the following static components:

Vanes of the Turbine $1^{st}$ and $2^{nd}$ stages
Casings of the Turbine $1^{st}$ and $2^{nd}$ stages.

In a particular embodiment, the closed circuit channeling the coolant working fluid stream separates into a plurality of sub-branches before impinging the different sections of the combustor and/or turbine and/or exhaust. Advantageously, this ensures optimum flow rates for each section to be cooled.

Once the hot working fluid leaves the primary heat exchanger (at a temperature above 400° C.), it circulates up to at least one expanding element which is configured to cause the working fluid to expand therefore driving an output shaft, preferably through a gearbox to accommodate speeds as needed.

In a particular embodiment, the expansion of the working fluid in the expanding element(s) contributes to more than 50% of the total power offtake extracted from each aero-engine gas turbine (i.e. sum of the power offtake obtained from the close cycle and power-offtake from engine shafts for each engine). In other words, for each engine, less than 50% of the total engine power offtake is extracted from the engine shafts.

As known, the expanding element in recuperative cycles may be embodied as a turbine, either a free power turbine or a turbine that may be mechanically coupled through a common shaft to the pumping element and/or compressor element. This forms a 'turbo-pump' or 'turbo-compressor'.

In a specific embodiment, the pumping element is driven by an independent electric motor fed by the power conversion system and the associated energy storage system described later on.

After expansion, the working fluid has less temperature and pressure than before entering the expanding element and, then, it is directed towards a heat sink to transfer and dispense with the residual heat previously acquired from the gas turbine engine. This is possible by means of the at least one pre-cooler which thermally communicates the heat sink and the working fluid. Having dispensed the residual heat, the working fluid is channeled towards the pumping element to start over the thermodynamic cycle described.

In an embodiment, the closed-cycle arrangement further comprises sensors, and control valves in each branch of the closed cycle arrangement for regulating the mass flow of the working fluid and, therefore, the heat and power extracted. The sensors can monitor, among other, the flow rate, temperature and pressure of the working fluid.

Specifically, the valves may regulate the fluid mass flows in respective sub-branches, should the closed circuit being split across different engine sections.

In addition, these hydraulic components may be configured to isolate the operation of the closed-cycle arrangement with one of the gas turbine engines for example in case of component failure.

As the closed-cycle is based on liquid or super-critical working fluids, it requires small pipes and valves in comparison to an air-based cycle. This significantly reduces the size of the cooling arrangement and makes it easier to control, with improved dynamic behaviour and shorter response times.

The closed-cycle arrangement is coupled to the behaviour of the gas turbine cycles and, therefore, it tightly matches said behaviour, especially during transient phases. The behaviour of the gas turbine engine is continuously monitored by sensors measuring engine parameters such as sections temperature, pressure and shaft speed. Thus, assisted by the hydraulic components that allows to regulate and match the open cycle of the engines, it is formed a related-cycle improving the dynamic and transient behaviour of the powerplant.

This gives a significant advantage in comparison to the known sub-systems in conventional engine arrangements. Specifically, the blade Tip Clearance Control (TCC) is now much more effective than in the known arrangements that use compressed air directed to the casing.

In a particular embodiment, the control of the closed loop cycle is tied to the blade tip clearance objectives of the turbine. Level of tip clearance can be estimated based on rotor speed, rotor temperature and casing temperature, which can be derived from basic parameters, such as turbine sections pressures and temperatures that are continuously monitored through sensors. For example, during engine development testing, thermocouples placed on the components give a correlation between components temperatures and the engine basic parameters monitored through sensors. This allows building calibrated performance and computer based thermo-mechanical models, giving the components deflections (especially, rotors axial and radial displacements and turbine casings deflections) as a function of the engine sections parameters, such as pressures, temperatures, shaft speeds monitored by sensors.

From these parameters it is allowed to control the closed-cycle operation by, for instance, tuning other parameters such as pressure, temperature, and coolant flow rates either of the entire closed-cycle or of a branch thereof, using the control valves previously mentioned. As a result, the close cycle arrangement is controlled to achieve casings cooling and deflections objectives and therefore Tip Clearance Control objectives of the turbine sections, especially during transient phases of the engine.

In a particular embodiment, at least one of the sub-branches bypass the expanding element and reconnect the closed circuit upstream of the pre-cooler. This embodiment is of benefit if a specific sub-branch maintains a temperature lower than the temperature of the main branch(es) before reaching the expander. This can optimise power release through the expander(s) as the sub-branch with low heat content is not used for power conversion.

Closed Power Cycle and Fuel System.

In the power generation industry, there are examples of industrial gas turbines, especially aero-derivative gas turbines, operating on ground and capable of burning natural gas and mixtures of natural gas and hydrogen, with low levels of emissions. These engines are substantially similar to aero gas turbine engines with modifications to the combustor chamber, thus rendering possible the stable burning of natural gas and hydrogen mixtures.

Feeding the aircraft powerplant gas turbines with low carbon fuels, or with at least a proportion of low carbon fuels, would reduce emissions of the gas turbine cycle in comparison to the current kerosene-based open cycle. The main current drawback is the storage of such alternative fuels within the airframe. For instance, as mentioned, such fuels requires cryogenic storage to maintain the fuel in a liquid form and much larger tank volumes in the case of Liquid Hydrogen.

Nowadays, Liquid Biomethane (LBM) and Synthetic Natural Gas (SNG) may be produced from biomass and renewable electricity using Power-to-Gas/Power-to-Liquid conversion processes. As the resulting fuel is methane-based, it can be stored using the existing ground infrastructure for natural gas, in a liquid or gas state. Hence, in terms of energy density for use in aircraft propulsion and ease of storage using an existing ground infrastructure, liquid methane based fuels provide significant advantages over Liquid Hydrogen. On the other hand, Liquid Hydrogen is a cleaner fuel than methane-based fuels.

In an embodiment, the aircraft powerplant is configured to house and distribute at least two fuel systems, each fuel system being based on a different fuel type:
  primary fuel system based on a Liquid methane based fuel or Kerosene for example, and
  one or more secondary fuel systems based on Liquid Hydrogen or a Liquid methane based fuel for example.

Each fuel type is housed in different fuel tanks and distributed by a dedicated system. Additionally, two or more different secondary fuel systems may have their own tanks and dedicated distribution system.

Preferably, the energy density and carbon content of the fuel in the secondary system is lower than the energy density and carbon content of the fuel the primary fuel system. The volumes of their respective tanks may be balanced to avoid major changes to the current aircraft configuration.

As a way of example, the following configurations may be considered:
  primary fuel system based on kerosene storing 80% of the total fuel mass & secondary fuel system based on liquid methane storing 20% of the total fuel mass, or
  primary fuel system based on liquid methane storing 90% of the total fuel mass & secondary fuel system based on liquid hydrogen storing 10% of the total fuel mass.

In a particular embodiment, the secondary fuel system may be used for example during take-off and landing to limit ground emissions and/or, in combination with the other system, to supply fuel mixtures to the injectors of the gas turbine engines combustion chambers.

In a particular embodiment, the level of mixture (i.e. gravimetric ratio of a primary fuel type vs. a secondary fuel type at a given time point) provided to the combustor injectors is regulated by valves in each fuel system and is a function of the aircraft altitude, known from air data sensors mounted on the aircraft.

In a particular embodiment, at least the secondary fuel system is configured to supply a Liquid methane based fuel and/or Liquid Hydrogen or mixtures, to at least one of the gas turbine engines. That is, at least one of the gas turbine engines is further configured to burn a Liquid methane based fuel, and/or Liquid Hydrogen and/or mixtures.

In a particular embodiment, the secondary fuel system contains a fuel additive in place of a fuel directly used for combustion. Similarly to the previous description, additives mass flow rates can be defined as a function of the aircraft altitude.

In an embodiment, at least one fuel tank comprises two separated walls and is vacuum evacuated. This allows storing the primary or secondary fuel as a liquid at cryogenic temperatures. The pressure in the fuel tank may be around 4-10 bar (liquid). As the aircraft engines will burn the fuel within 24 hours, this solution allows liquid storage of the fuel at cryogenic temperatures without the need of complex cooling systems to prevent fuel evaporation.

In a particular embodiment, the fuel system comprises a high-pressure pump configured to pressurize and vaporize a Liquid methane based fuel or Liquid hydrogen, preferably at least at or around 300 bar. This high-pressure pump allows maintaining a low pressure in the fuel tanks. This reduces the fuel tanks stresses and weight.

In a specific embodiment, the high-pressure fuel pump is driven by an independent electric motor fed by the power conversion system and the associated energy storage system described later on.

In a preferred embodiment, the heat sink of the closed-cycle arrangement is a fuel tank comprising either a primary or any of the secondary fuels.

In a preferred embodiment, the heat sink of the closed cycle arrangement is a portion of an airframe cold surface, potentially subjected to icing, such as the wing leading edges.

Advantageously, in the present disclosure the lowest temperature is preferably one of the fuel tanks, taking into account that stored liquid fuel has a very large low temperature mass, especially in the case of a Liquid methane based fuel or Liquid hydrogen stored at cryogenic temperatures. Without prejudice of the latter, a low temperature point may be, in addition, ram air and/or bypass air. As described later on, ram air can be channeled using an inlet added to the airframe structure.

Additionally or alternatively of the fuel vaporization based on the high pressure pump, in a particular embodiment, the fuel system further comprises a channeling in thermal communication with a combustor section or turbine section or exhaust of a gas turbine engine by means of at least one heat exchanger so that heat is transferred from the respective gas turbine engine to a Liquid methane based fuel or Liquid Hydrogen for its heating and potentially, its vaporization.

Similarly to the working fluid of the closed-cycle running through a primary heat exchanger (typically printed on the combustor or turbine casing), the heat from the engine is used to heat up and potentially vaporize the running fuel.

This heat exchanger may be positioned adjacent to the closed-cycle primary heat exchanger or, otherwise, they may intercalate.

In a specific embodiment, both the open cycle of the gas turbine engine and the closed-cycle are methane based, in other words, gas turbines engines are configured to burn (exclusively or in mixtures) a methane based fuel and this fuel is also used for heat recuperation in the closed-cycle, that is the working fluid of the closed-cycle may be methane based. This creates a strong coupling between the gas turbine cycle, the closed-cycle and the fuel system, while taking advantage of the available ground infrastructure.

Closed Power Cycle with Boost

In a particular embodiment, the closed-cycle arrangement further comprises a boosting system configured to add power to the thermodynamic cycle of the working fluid. In a particular embodiment, the boosting element may add power to the closed-cycle either by heat or mechanical means, for instance, by using one or more of the following:
- a re-heating step before the expanding element;
- a re-compression step with inter-stage cooling between two compressors;
- a condensation step, located after the expander when the working fluid is configured to undergo complete (gas↔liquid) phase changes.

In case of the boosting being achieved by re-compression, the pumping element of the closed cycle is embodied as two compressors mechanically coupled to the expanding element(s), which in turn can be embodied, for instance, as turbine(s). Alternatively, the pumping element(s) can be driven by independent electrical motor(s).

In a preferred embodiment, the boosting element is a heater configured to heat the working fluid by burning the cleanest of the fuels stored in the aircraft, for example, Liquid hydrogen and/or a Liquid methane based fuel.

In a preferred embodiment, the heater is positioned within the airframe structure and is ventilated by ram air.

The use of low carbon fuels is considered to limit emissions produced by the heater. Since the heater combustion products do not hit turbine blades like in open gas turbine cycles, feeding the heater in this way, does not create a risk for instance, of hydrogen embrittlement of downstream components. Due to the advantages of the closed-cycle, relatively to the open-cycle (especially, its easier control and reduced impacts to downstream components), the size of the heater can be increased relatively to the size of the gas turbine combustor, shifting the balance between cycles.

In a specific embodiment, the maximum temperature of the thermodynamic close-cycle is around 700° C., while mass flow rate and pressure are still at around 45 kg/sec and around 100 bar, respectively, for an engine rated at 350 kN-500 kN Take-Off Thrust.

Closed Power Cycle with Boost and Fuel Cell

In a preferred embodiment, the powerplant further comprises an electrochemical device such as a high-temperature fuel-cell configured to convert chemical energy of fuel into electrical energy for assisting the closed-cycle arrangement on supplying electrical energy to the at least one aircraft system.

This electrochemical device may be positioned at the tail cone of the airframe structure similarly to the conventional position of existing Auxiliary Power Units but, unlike the latter, which is a stand-alone system, the electrochemical device is fed by the (secondary) fuel system alike the heater and possibly the gas turbines.

In a particular embodiment, the electrochemical device is configured to receive and use secondary fuel, being said fuel Liquid hydrogen, and/or a Liquid methane based fuel. In a preferred embodiment, the electrochemical device is a high temperature fuel cell, such as a Solid Oxide Fuel Cell, configured to receive and use a methane based fuel.

In a particular embodiment, said electrochemical device is configured to be simultaneously fed by high temperature compressed bleed air received from the at least one gas turbine engine compressor.

In this embodiment, compressed air at around 650° C.-700° C. is bled from the last stages of the compressor to quickly heat up and feed the high-temperature fuel-cell. Advantageously, the high-temperature fuel cell is quickly heated up by external means thus solving the great delay typically seen when they do at their own. Therefore, high-temp fuel-cell, typically not used in mobile applications, can be advantageously applied here.

Thus, advantageously, in a specific embodiment the total power generated in addition to the power generated by the gas turbine engine is around 7±2 MW, that is, the sum of [1.5 to 3.5 MW] from the closed-cycle arrangement, [2 to 3.5 MW] extra for using the heater and [1.5 to 2 MW] from the high-temperature fuel-cell.

In a preferred embodiment, the open cycle of the gas turbine engine, the closed-recuperation cycle, the combustion cycle of the heater, and the fuel cell cycle are methane based. In other words, gas turbines engines are configured to burn (exclusively or in mixtures) a methane based fuel and this fuel is also used for heat recuperation/power extraction in the closed-cycle, combustion in the heater and fuel cell operation. This creates a strong coupling between the gas turbine cycle, the closed-cycle, the heater and the fuel system, while taking advantage of the available ground infrastructure.

Power Conversion

For the closed-cycle arrangement being capable of supplying power to at least one power-demanding system, and particularly, given the diversity of equipment and systems and their specific specifications, it further comprises a power conversion system configured to receive the generated electrical power by the electrical generator(s) and to accommodate it to the specific electrical specifications of the power-demanding systems.

As known, each power-demanding system comprises at least one electrical load with specific electrical specifications to be fed with.

In a preferred embodiment, the power-demanding system (or consumer, or aircraft system) is at least one of the following:
- Wing Ice Protection Systems (WIPS), preferably to be supplied at 230 VAC or +/−270 DC,
- actuating motors of the aircraft, preferably to be supplied at 230 VAC,
- lighting, galley and entertainment cabin systems, preferably to be supplied at 115 VAC,
- cabin electronics and avionics, preferably to be supplied at 28 VDC,
- environment control system (ECS), preferably to be supplied at +/−270 DC,
- microcontrollers such as MCU inverters, preferably to be supplied at +/−270 DC,
- electrical motors (particularly to drive the pumping element(s) of the closed cycle arrangement and/or of the fuel pump(s) of the primary and secondary fuel systems).

The following table, Table 1, provides the typical specific electrical specifications of the electrical components used in the power conversion architecture.

TABLE 1

| COMPONENTS | POWER (KVA) | RATED VOLTAGE (V) |
|---|---|---|
| Generator | 250 | 230 VAC |
| Generator | 250 | ±270 VDC |
| AC/AC converter | 150 | 230 ➔ 115 VAC |
| AC/DC converter | 150 | 230 ➔ 28 VDC |
| AC/DC converter | 150 | 230 ➔ ±270 VDC |
| DC/DC converter | 12 up/ 15 down | ±270 ➔ 28 VDC |
| Fuel Cell DC/DC | 120 | 10~500 VDC ➔ ±270 VDC |
| DC/AC converter | 100 | ±270 ➔ 230/115 VAC |
| DC/AC converter | 50 | 28 ➔ 230/115 VAC |
| LV Battery | 12 | 28 V |
| HV Battery | 100 | 270 V |

The low voltages levels used in Table 1 are conservative and are in accordance with aircraft standard MIL-STD-704. As mentioned previously, the use of low voltages levels guarantee the safety of the installation.

Besides those listed above, HV DC power may be configured to a higher level e.g., to 1 kVDC or 3.5 kVDC other than 270 VDC if higher power is required. Increasing the HV DC voltage level to 1 kVDC or even 3.5 kVDC advantageously reduces the magnitude of the current and, hence, the cable diameter, reducing weight.

In a particular embodiment, the above power devices (e.g., SiC power modules) may be configured in parallel or in series connections to fulfil different power ratings.

From the components specification listed in Table 1 together with HV DC voltages up to 3.5 kVDC, the disclosure discloses a power conversion architecture, with two main legs. The first leg targets low power demanding applications and is based on generators rated at 230 VAC. The second leg targets higher power demanding application and is based on generators rated at [270V-3.5 kVDC]. The power conversion system is scalable and can accommodate a large range of total power levels by increasing the total number of generators.

In a particular embodiment, the at least one electrical generator is configured to generate electricity at 230 VAC power bus or at DC power bus of at least +/−270 VDC up to 3.5 kVDV.

Then, in a preferred embodiment, the output shaft of the at least one expanding element is connected to six 250 KVA electrical generators generating current at 230 VAC power bus. In this configuration, the closed-cycle arrangement extracts at least 1.5 MW from the gas turbine engines.

In a particular embodiment, the power conversion system comprises at least one power converter configured to convert the generated electricity into at least one of the following voltage buses: 115 VAC, 28 VDC or +/−270 VDC. In a preferred embodiment, the at least one power converter is:
- an AC/AC converter to convert the generated 230 VAC to 115 VAC power bus and supply 115 VAC 3-phase loads of the aircraft systems,
- an AC/DC converter to convert the generated 230 VAC to 28 VDC power bus and supply 28 VDC loads of the aircraft systems,
- a DC/DC converter to convert the at least +/−270 VDC to 28 VDC power bus and supply 28 VDC loads of the aircraft systems,
- a DC/AC converter to convert the at least +/−270 DC to AC power bus for supplying AC loads of the aircraft systems.

Bidirectional DC/DC converter may also condition AC/DC output to charge the HV battery described later.

Multiple converters of each type may be also used in order to ensure that the cable diameters in the power harness are kept down to a manageable level.

In a particular embodiment, the aircraft powerplant further comprises an energy storage means, the energy storage means being at least one of the following: a low voltage ('LV') or high voltage ('HV') battery, or a flywheel.

An energy storage device alike a battery or a flywheel ensures that the generated energy is being dampened, as the electrical loads are balanced and the extra energy that cannot be consumed at that moment can be stored for later use.

In a particular embodiment, the energy storage means is at least one battery, and the airframe structure further comprises a battery management system (BMS) configured to control the operation of the at least one battery for the at least one battery to store excess energy and/or to smooth the output of the power bus under transient loads and load fluctuations.

In a preferred embodiment, the energy storage means is mostly one or more HV batteries in order to store energy and provide assisting power to the electrical loads, preferably in case of large electrical loads. Particularly, for large HV battery packs, a BMS is provided.

In a particular embodiment, the battery pack is a modular design using a combination of 400V subpacks. Each battery subpack consists of several configurable modules and each module consists of several cells. Each subpack is rated at 350 VDC (which can be adjusted to 270 VDC if needed via combination of battery cells), has a discharge current of 375 A/1356 A, its energy content is 70 kWh and weights 500 kg (including packaging and harness). Each battery subpack can deliver power at 465 kW and recuperation power at maximum 110 kW.

In a particular embodiment, a HV battery pack DC bus voltage level is reconfigurable via contactors to group to 400V, 800V or even of higher voltage. Its modularity allows reducing the HV insulation requirements to 400V level, even for higher voltage batteries.

As the battery pack is reconfigurable, the subpacks may be grouped in parallel for higher current outputs to drive loads that require higher peak power. For example, 2s2p (2 in serial connection and 2 in parallel connection) can provide pure 800 VDC electric drive at 0.93 MW power continuously for 10 mins without charging.

In a particular embodiment, the energy storage means comprises a charging port and/or is replaceable. Advantageously, a HV battery pack can be charged in situ via the charging port and/or be replaceable with a fully charged battery pack quickly thanks to, for instance, quick removable designs. Thus, the removed battery pack may be charged and serviced in a specialised facility (i.e., for replacing fatigued modules).

In addition, heating and cooling can be performed via cooling plates beneath the modules coupled via a silicon based thermal conductive pad. Heat from the gas turbine engine may be used to maintain the battery temperature between 10-55° C. Thus, the energy storage means further comprises cooling plates arranged beneath and, preferably, coupled via the silicon-based thermal conductive pad.

Also, in a further embodiment, the HV battery is configured to provide additional high power boost during the aircraft take-off and climb. This high power released by the battery to electrical loads, reduce engine power-offtake and therefore protects the gas turbine engines during the most critical flight phases such as take off and climb. Especially, it increases the margins against operation in compressor surge domain or blades flutter domain.

On the other hand, during the aircraft cruise and landing phases, the HV battery is configured to provide power to electrical loads and be (re)-charged in order to maintain a desired State-Of-Charge. An eventual excessive charging power may be passed to a fly-wheel.

In a particular embodiment, the aircraft powerplant further comprises at least one protective device for stopping the power generation from the output shaft of the expanding element. Said protective device can be a clutch for decoupling the output shaft to the at least one electrical generator, and/or, at an electronics-level:

switches or shutting-off devices to control or stop the power supplying to the power-demanding system, and/or switches or shutting-off devices operable by the battery management system to stop current toward the at least one battery if fully charged.

FURTHER EMBODIMENTS

In a particular embodiment, specific sub-branches of the closed cycle arrangement, in conjunction with compressed air bled from the gas turbine engine(s) and/or ram air are used for the thermal management of the power plant components, especially its power conversion system (including batteries), the fuel cell, and the heater previously described. Through flow rates regulation provided by control valves informed by sensors, the thermal balance between high temperature inputs (engine bleed, close cycle branch downstream of the primary heat exchanger) and low temperature inputs (ram air, close cycle branch upstream of the primary heat exchanger) to a specific component can be maintained through the flight profile and according to the specific temperature requirements of the component.

In a particular embodiment, the powerplant further comprises a thermo-electric generator, preferably a 3D printed thermo-electric generator, arranged on any turbine casing or combustor.

Advantageously, this allows recovering further energy from the turbine heat for increasing efficiency of the whole powerplant.

Hereinafter it is described advantageous constructions of the individual elements previously disclosed.

In a particular embodiment, at least one primary heat exchanger is 3D printed onto the respective turbine casing, and/or the respective combustor, the primary heat exchanger being preferably 3D printed with a Nickel-based alloy. In a preferred embodiment, the at least one primary heat exchanger is 3D printed onto the turbine casing, and/or the combustor as serpentines.

As mentioned, with preference, each of the primary heat exchangers is arranged in such a way it does not impinge to the core gas path of the gas turbine engine. As the heat transfer is performed at this point by using the casings external surface and engine structure inner channels, there is no performance impact to the primary flow path of the gas turbine engine.

In a preferred embodiment, at least one expanding element is a turbine and at least one pumping element is a pump or compressor, being mechanically coupled with the turbine through a common shaft. An assembly of a turbine and a pump or compressor mechanically coupled to each other through a common shaft forms a 'turbo-pump' or 'turbo-compressor'.

In a particular embodiment, the turbo-pump or turbo-compressor is manufactured as a monoblock rotor using 3D printing of a high temperature resistant Nickel-based alloy. Because of the small size of the turbo-pump or turbo-compressor needed for using s-CO2 (as per its high power density), and the distributed power architecture further lowering component sizes (for example 6 generators coupled to the expanding elements), the turbo-pump or turbo-compressor can be 3D printed. 3D printing further allows the inclusion of internal cooling channels.

In a particular embodiment, the turbo-pump or turbo-compressor is radial. In yet another embodiment, the turbo-pump or turbo-compressor comprises magnetic bearings.

In a particular embodiment, the turbo-pump or turbo-compressor is configured to be cooled down by water, by the working fluid of the closed cycle and/or by ram air ventilation.

In a second aspect, the disclosure provides an airframe structure of an aircraft comprising, wherein the airframe structure comprises ventilation ports and an exposed recess defining a large ventilated volume, wherein the recess is configured to house the heater, and/or the electrochemical device, and/or the power conversion system, and wherein the exposed recess is configured for allowing direct exposure of the components housed within to ram air.

In a third aspect, the disclosure provides an aircraft comprising an airframe structure and a powerplant according to any of the embodiments of the previous aspects.

It is to be noted that the airframe structure is configured to house at least the pumping element, the expanding element, the electrical generator, and the power conversion system of the powerplant.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the disclosure will become clearly understood in view of the detailed description of the disclosure which becomes apparent from a preferred embodiment of the disclosure, given just as an example and not being limited thereto, with reference to the drawings.

FIGS. 4a-c—These figures show embodiments of the architecture of the power conversion system according to the disclosure.

FIG. 9—This figure shows the ventilation of the powerplant components housed within the airframe.

DETAILED DESCRIPTION

FIG. 1

Figure 1:
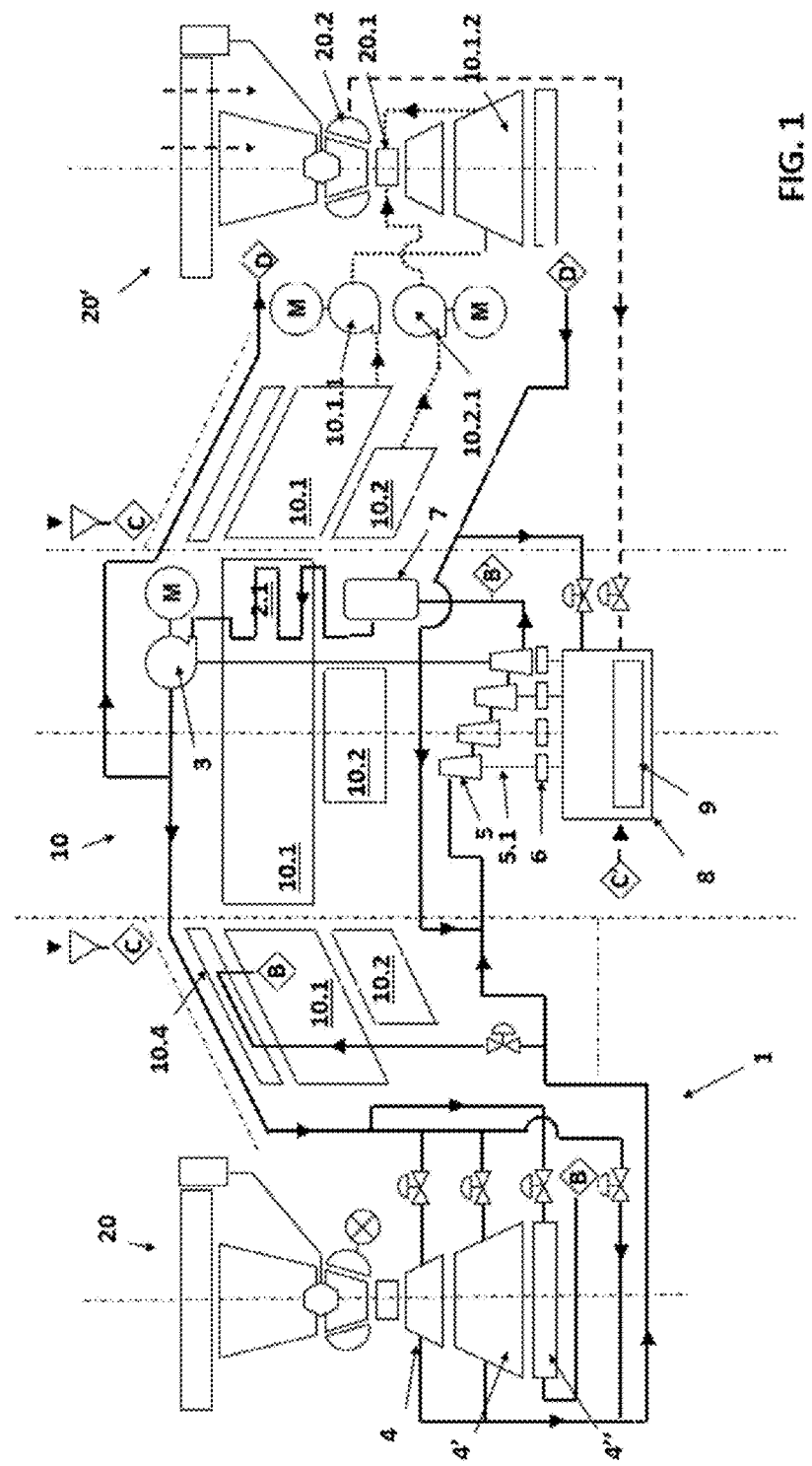
FIG. 1—This figure shows a schematic view of the airframe and powerplant according to an embodiment of the present disclosure.

The present disclosure discloses a powerplant for an aircraft comprising:

at least two gas turbine engines (20, 20'), and
at least one closed-cycle arrangement for recuperating heat from the at least two gas turbine engines (20, 20') and supplying power to at least one power-demanding system, wherein the closed-cycle arrangement comprises:
a closed circuit (1) channeling a working fluid subjected to a thermodynamic cycle;
at least one pre-cooler (2.1, 2.2) configured to transfer heat from the working fluid to a heat sink;
the heat sink in thermal communication with the pre-cooler (2.1, 2.2), the heat sink being a fuel tank and/or an airframe surface;
at least one pumping element (3) configured to move the working fluid through the closed circuit (1);
at least two primary heat exchangers (4, 4', 4"), each one configured to transfer heat from a respective gas turbine engine (20, 20') to the working fluid;
at least one expanding element (5) configured to drive a gearbox and an output shaft by the expansion of the working fluid; wherein the output shaft driven by the expanding element (5) is connected to at least one electrical generator (6) configured to generate electrical power; and
a power conversion system (8) configured to receive the generated electrical power by the electrical generator (6) and to accommodate and supply it to the at least one power-demanding system;
wherein the closed-cycle arrangement is adapted to be partially housed within the airframe structure (10) of the aircraft, so that at least the pumping element (3), the expanding element (5), the electrical generator (6), and the power conversion system are housed in said airframe structure (10).

Figure 2:
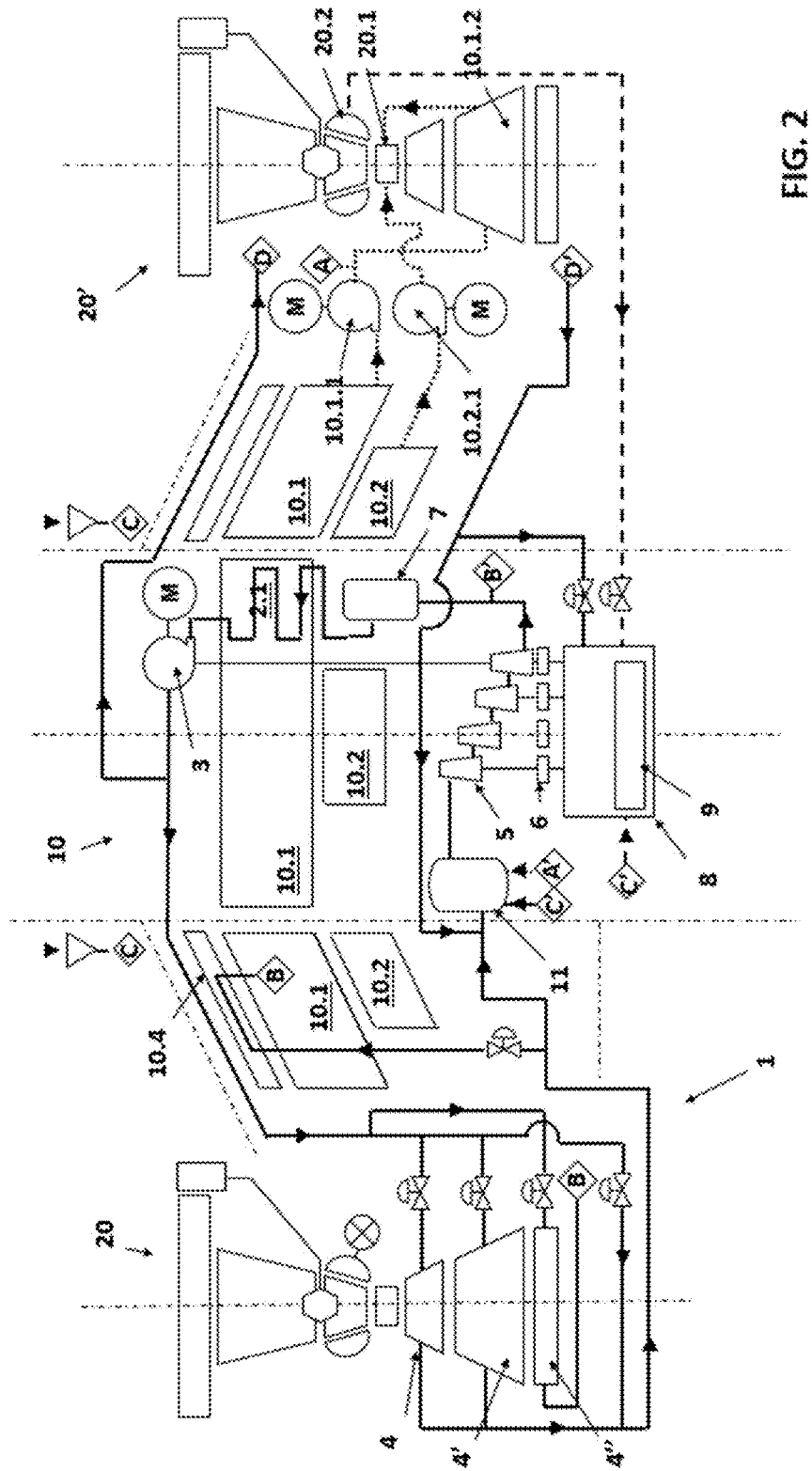
FIG. 2—This figure shows a schematic view of the airframe and powerplant according to an embodiment of the present disclosure, wherein the closed-cycle arrangement further comprises a boosting element such as a heater.
Figure 3:
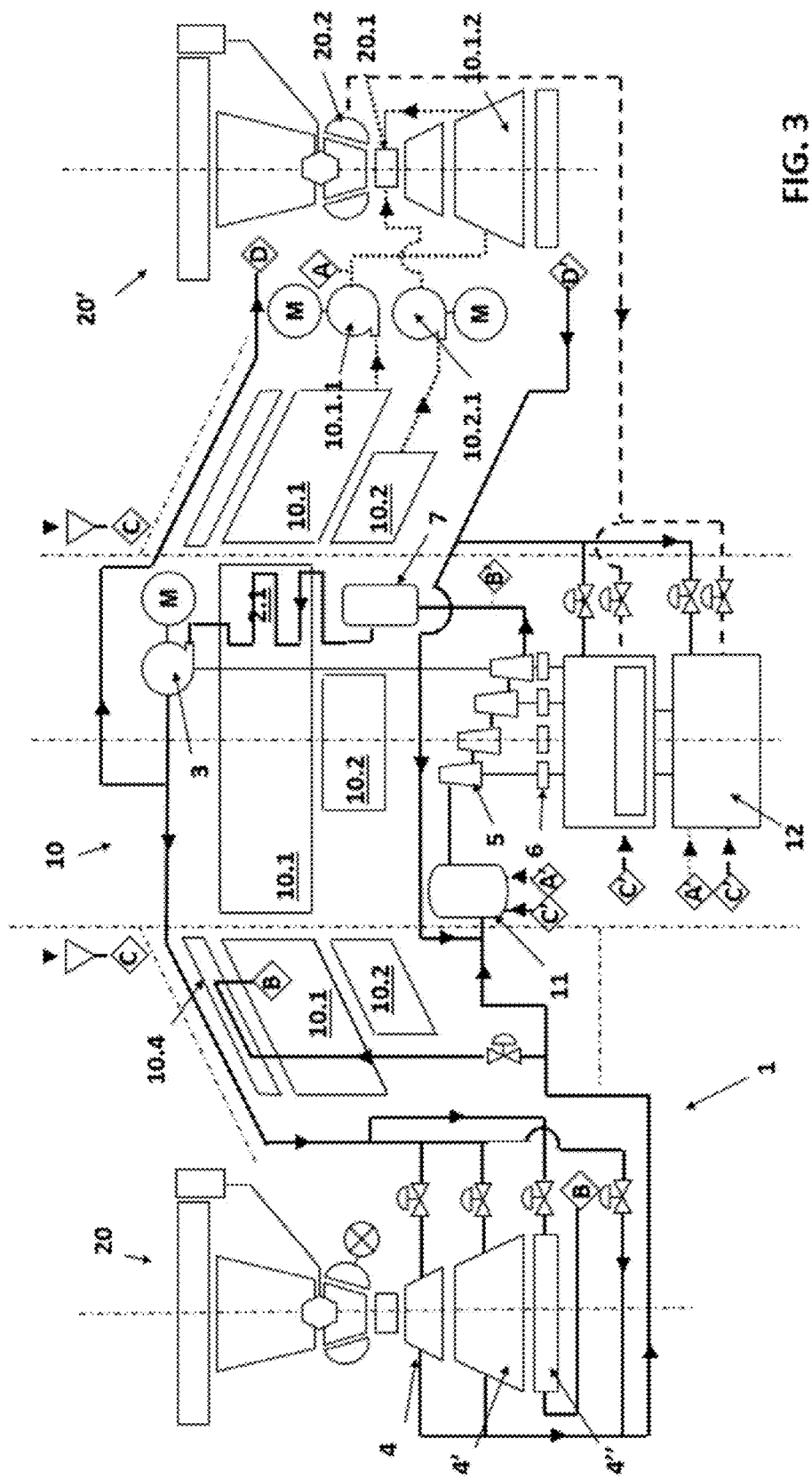
FIG. 3—This figure shows a schematic view of the airframe and powerplant according to an embodiment of the present disclosure, wherein the airframe structure further comprises an electrochemical device such as a high-temperature fuel-cell.

According to the present disclosure, the airframe structure (10) houses some of the components of the closed-cycle arrangement, for instance, the pumping element(s) (3), the expanding element(s) (5), the electrical generator(s) (6), and the power conversion system (8). Particularly, as can be seen in FIGS. 1 to 3, these components are housed within the airframe structure (10), such as the fuselage belly fairing enclosure, which provides a volume suitable to confine large components with specific temperature requirements.

For illustrative purposes, the left portion of the power scheme of FIG. 1 details the heat recovery from one of the aero gas turbine engines showing, inter alia, an embodiment of the routing of the closed-cycle circuit (1). The right portion of this scheme in turn depicts the coupling of the fuel systems (either primary or secondary) with the other aero gas turbine engine (20'). As disclosed by the disclosure, the closed-cycle circuit (1) also extends to the right side of FIG. 1, while the fuel system also interacts with the aero gas turbine engine (20) represented in the left part of FIG. 1. In other words, the scheme is symmetrical relatively to the aircraft middle plane.

For illustrative purposes, the closed cycle circuit (1) is represented in solid lines, while the fuel supply lines are schematically represented in dotted lines, and the air distribution is represented in dashed lines. The arrows indicate the direction of the running fluid, e.g. working fluid of the closed-cycle, fuel, or air.

As it can be observed in FIG. 1, the working fluid is pumped by a main pumping element (3) that circulates it toward each gas turbine engine (20, 20'). After the pumping element (3), a split valve (not shown in FIG. 1) separates the circuit into two identical main loops (or branches), each one coupled with an aero gas turbine engine (20, 20'). For scheme simplification purposes, the working fluid on the right part of the scheme reaches the point D first, interacts with the gas turbine engine (20) as detailed on the left part of the scheme, and then reaches the point D'.

With reference to the left part, after being pumped by the pumping element (3), the working fluid then recuperates heat from a respective combustor section and/or turbine section and/or exhaust of said gas turbine engine (20') using a heat exchanger(s) (4, 4', 4").

Any or all of these heat exchangers (4, 4', 4") can be 3D printed preferably using a high temperature resistant Nickel-based alloy onto the respective external surfaces of the combustor casing (20.4), turbine casing (20.3) or exhaust nozzle of the gas turbine engine (20). Similarly, the heat exchanger can also be printed on the surfaces of the combustor, internal surfaces of nozzles guide vanes (20.3.2) or turbine structures. Overall, the intent is to preferably avoid an impingement of the heat exchanger with the gas turbine primary gas path. This prevents an impact to gas velocities and performance drawback, especially during transient operation of the gas turbine engine.

After passage through the heat exchangers (4, 4', 4"), the working fluid is subjected to an expansion step, by passage through one or successive expanding elements (i.e. turbine elements). Each of these expanding elements (5) preferably drives a gearbox and an output shaft (5.1) which in turn drives an electrical generator (6) for generating electrical power.

Finally, the working fluid is cooled down and reaches back the initial cold step of the thermodynamic cycle. For this purpose, there is a pre-cooler (2.1, 2.2) in thermal communication with a heat sink as shown in FIG. 1. This heat sink may be a primary or secondary fuel tank (10.1, 10.2) or an aircraft surface subjected to icing and/or ram air input. An embodiment of a 3D printed pre-cooler (2.1, 2.2) onto a fuel tank (10.1, 10.2) or wing leading edge internal surface (10.4) can be seen in FIG. 7 or 8, respectively.

In the present scheme, the lowest temperature point of the thermodynamic cycle can be a fuel tank and/or a surface element of the airframe static structure. These cold structures have large cold thermal masses and in the present disclosure, become an element of the combined cycle. In other words, these cold static structures form part of the power generation function.

In a specific embodiment, FIG. 1 also depicts a condenser (7) for allowing a condensation step in the thermodynamic cycle of a working fluid capable to undergoing phase changes. In this case, the condenser (7) is placed downstream of the expanding element (5).

After cooling, the working fluid reaches the pumping element previously mentioned. This pumping element (3) may be a compressor or pump mechanically coupled to at least one expanding element (5) such as turbine(s) through a common shaft forming a turbo-compressor or turbo-pump thereby. Alternatively or additionally, as shown in FIG. 1, the pumping element (3) may be driven by an electrical motor (M) fed by the power conversion system (8) and its energy storage elements (9), described later on.

Regarding the fuel system used in the scheme, the powerplant of FIG. 1 depends on at least two different fuel systems, each fuel system being based on a different fuel type:
- a primary fuel such as kerosene and/or a liquid methane based fuel, and
- a secondary fuel such as Liquid hydrogen, and/or a Liquid methane based fuel Each fuel type is housed and stored in separated fuel tanks (10.1, 10.2) and employs a dedicated distribution system. Throughout FIGS. 1 to 3, it can be seen 3 off fuel tanks (10.1) of the primary fuel system and 3 off fuel tanks (10.2) of the secondary fuel system, henceforth 'primary fuel tanks' (10.1) and 'secondary fuel tanks' (10.2). As can be observed, the secondary fuel tanks (10.2) are smaller than the primary fuel tanks (10.1) and, for instance, the fuel mass stored may be between 80% and 90% in the primary fuel tanks (10.1), and between 10% and 20% in the secondary fuel tanks (10.2).

Due to the density difference of the different fuel types, the fuel tanks of each system (10.1, 10.2) are arranged symmetrically relatively to the airframe mid-section to avoid any airframe unbalance.

Both the primary and secondary fuel systems (with fuels stored in the respective tanks (10.1, 10.2)) may comprise standard pump(s) or high-pressure pump(s) (10.1.1, 10.2.1) for pressurizing and vaporizing respective fuels. If the fuel requires cryogenic storage, the fuel may be stored at cryogenic temperatures at around 4-10 bar in the fuel tanks to reduce tank wall stresses and then a high-pressure pump (10.1.1, 10.2.1) is configured to pressurize it at around 300 bar before reaching the combustion chamber (20.1).

Alternatively or additionally, as shown in FIG. 1, the fuel pumps (10.1.1, 10.2.1) may be driven by an electrical motor (M) fed by the power conversion system (8) and its energy storage elements (9), described later on.

Alternatively or additionally to the latter, as shown in FIG. 1 for the secondary fuel system, the fuel system (primary or secondary) can also channels the fuel towards a heat exchanger (10.1.2) in order to be in thermal communication with the respective gas turbine engine (20') for fuel heating and vaporization before being injected into the combustor (20.1). In the proposed scheme, the construction of the fuel heat exchanger (10.1.2) is similar to the construction of the primary heat exchanger (4, 4', 4") in the recuperation cycle. This type of arrangement may complement the pressure and temperature increase provided by the fuel pump(s) placed downstream and/or upstream of the heat exchanger (10.1.2).

As shown in FIG. 1, both fuel distribution systems reach the combustor (20.1). This allows the combustor to be fed by single fuels or fuels mixtures. The fuel mixture (i.e. gravimetric ratio of primary fuel type vs. secondary fuel type) can be adapted as a function of the flight profile by controlling the flow rates in each fuel system.

In addition to the main interactions between the closed-cycle, the fuel system and the airframe structure, FIG. 1 details further mechanisms improving the performance of the whole powerplant.

In particular, as a way of example, upstream of the gas turbine engine (20), the circuit (1) splits into 4 distinct and parallel sub-branches: one directed at the High Pressure (HP) turbine, one directed at the Low Pressure (LP) turbine, one directed at the exhaust, and one bypassing the gas turbine engine (20) for safety and regulation purposes. Each of these branches further comprises control valves for regulating the flowrate of the working fluid in each branch. The control valves are driven by engine parameters (shaft speeds, turbine pressures and temperatures) and closed-cycle parameters (flowrates, pressures, temperatures), continuously monitored through sensors.

Each of the sub-branches directed at the HP Turbine, LP Turbine and Exhaust comprise a heat exchanger (4, 4', 4"). The heat exchangers (4, 4', 4") allow thermal exchange of the closed-cycle circuit with the gas turbine engine (20). As a way of example, the sub-branch directed at the exhaust by-passes the expanding elements (5) from point B to B'. This forms a standalone branch, for cooling purposes only, which does not contribute to the power generation of the closed-cycle as it buy-passes the expanding elements (5).

Similarly, an example of further fluid diversion for other purposes rather than power generation of the closed-cycle can be found on the branch downstream of the primary heat exchangers (4, 4', 4") headed through a control valve to the leading edge (10.4) of that wing for heating purposes. This assists or replaces the anti-ice wing system. After that, this diverted working fluid by-passes the expanding elements (5) from point B to point B'.

Finally, the scheme of FIG. 1 depicts the power conversion system. For illustrative purposes, FIG. 1 depicts 4 off expanding elements (5), 4 off output shafts (5.1), and 4 off generators (6) while, in the described embodiment of FIG. 1, the output shafts (5.1) are preferably connected to six 250 KVA electrical generators (6) generating current at 230 VAC power bus thus amounting to 1.5 MW. This means that a high power level (i.e. higher than the Power offtake in conventional gas turbine engines rated at 350-500 kN Take-Off thrust) can be reached using an architecture with conservative low voltages levels as per MIL-STD-704.

It can be observed in FIG. 1 that the powerplant comprises an energy storage means (9) ensuring that the recuperated energy is being dampened, and the extra energy (the one that cannot be consumed at that moment) is stored for later use. The energy storage means (9) may be a low voltage ('LV'), and/or a high voltage ('HV') battery, and/or a flywheel depending on the power rating.

As will be discussed below, with preference, the energy storage means (9) is one or several HV batteries, and the powerplant further comprises a battery management system (BMS) configured to control the operation of the at least one battery for the at least one battery to store excess energy and/or to smooth the output of the power bus under transient loads and load fluctuations during transitioning flight phases.

Likewise, although not represented in these figures, the powerplant may further comprise at least one protective device (not shown) for stopping the power generation from the output shaft of the expanding element (5). Said protective device can be either mechanical such as a clutch for decoupling the output shaft to the at least one electrical generator (6), and/or, at an electronics-level such as:

switches or shutting-off devices to control or stop the power supplying to the power-demanding system, and/or switches or shutting-off devices operable by the battery management system (BMS) to stop current toward the at least one battery if fully charged.

Advantageously, it reduces the energy output of the output shaft if the energy consumption is lower than the energy generation and, possibly, the battery is at full capacity and cannot take further charge.

Related also to power electronics, the powerplant may further comprise a thermo-electric generator (not shown), preferably a 3D printed thermo-electric generator, arranged on any turbine casing or combustor for further heat recovery.

A key requirement of the power conversion system is to maintain adequate temperatures through the different phases of the flight cycle. This is mainly achieved through ram air ventilation. Point C in FIG. 1 represents inlet for ingesting ram air which is directed to, inter alia, point C' for further cooling of the power conversion system and related electronics.

In addition, bleed air from compressor stages (20.2) and/or a heating or cooling buy-pass lines from the closed cycle arrangement can be directed to the power conversion system (8) and battery (9) for thermal regulation of the cold airflow obtained by ram air.

FIG. 2

FIG. 2 depicts a schematic view of the powerplant according to FIG. 1, wherein the closed-cycle arrangement further comprises an additional boosting system for adding power to the thermodynamic cycle of the working fluid.

In the embodiment of FIG. 2, the boosting system adds power using a re-heating step before the expanding element (5). The boosting system is a heater (11) configured to heat the working fluid by burning the primary or secondary fuel type (see input of point A') and air (see input of point C').

As it can be observed, the boosting system is arranged at a location upstream of the expanding element (5) and, more preferably, just before the expanding element (5).

Thanks to the re-heater, the T. of the thermodynamic closed-cycle is increased to around 700° C., while mass flow rate and pressure are still at around 45 kg/sec. and around 100 bar, respectively.

Then, the output shaft(s) (5.1) is connected to twenty 250 KVA electrical generators (6) generating current at 230 VAC power bus thus amounting to 5 MW.

In the embodiment of FIG. 2, the heating element (11) is positioned in the airframe belly fairing enclosure.

Similarly to the power conversion system, the heating element (11) requires ventilation. This requirement is met by feeding of ram air (see inlet points C) to the heater walls.

FIG. 3

FIG. 3 depicts a schematic view of the powerplant according to FIG. 2 further comprising an electrochemical device (12) such as a Solid Oxide high-temperature fuel-cell.

This electrochemical device (12) is configured to convert chemical energy of primary or secondary fuels into electrical energy for assisting the closed-cycle arrangement on supplying electrical energy to the at least one power-demanding system.

Preferably, the electrochemical device (12) is positioned at the tail cone or empennage of the airframe structure (10). The powerplant fuel systems comprise distribution piping configured to feed the electrochemical device (12) alike the heater (11), see for instance input points A' (fuel supply) and C' (air supply).

Further, in order to expedite heat-up, the electrochemical device (12) is configured to receive bleed air bled from the compressor (20.2) of at least one gas turbine engine (20, 20').

Additionally or alternatively, the electrochemical device (12) can be heated-up using a standalone branch derived from the closed-cycle.

Thus, advantageously, in this embodiment the power generated in total is around 7±2 MW, that is, the sum of [1.5 to 3.5 MW] from the closed-cycle arrangement, [2 to 3.5 MW] extra for using the heater and [1.5 to 2 MW] from the high-temperature fuel-cell.

As it can be seen from FIG. 3, the electrochemical device (12) is also connected to the power conversion system (8) and energy storage means (9) to supplying electricity to at least one power-demanding system.

Similarly to the power conversion system, the electrochemical device (12) requires ventilation. This requirement is met by feeding of ram air (see inlet points C) to the electro-chemical device.

FIG. 4a

Figure 4A:
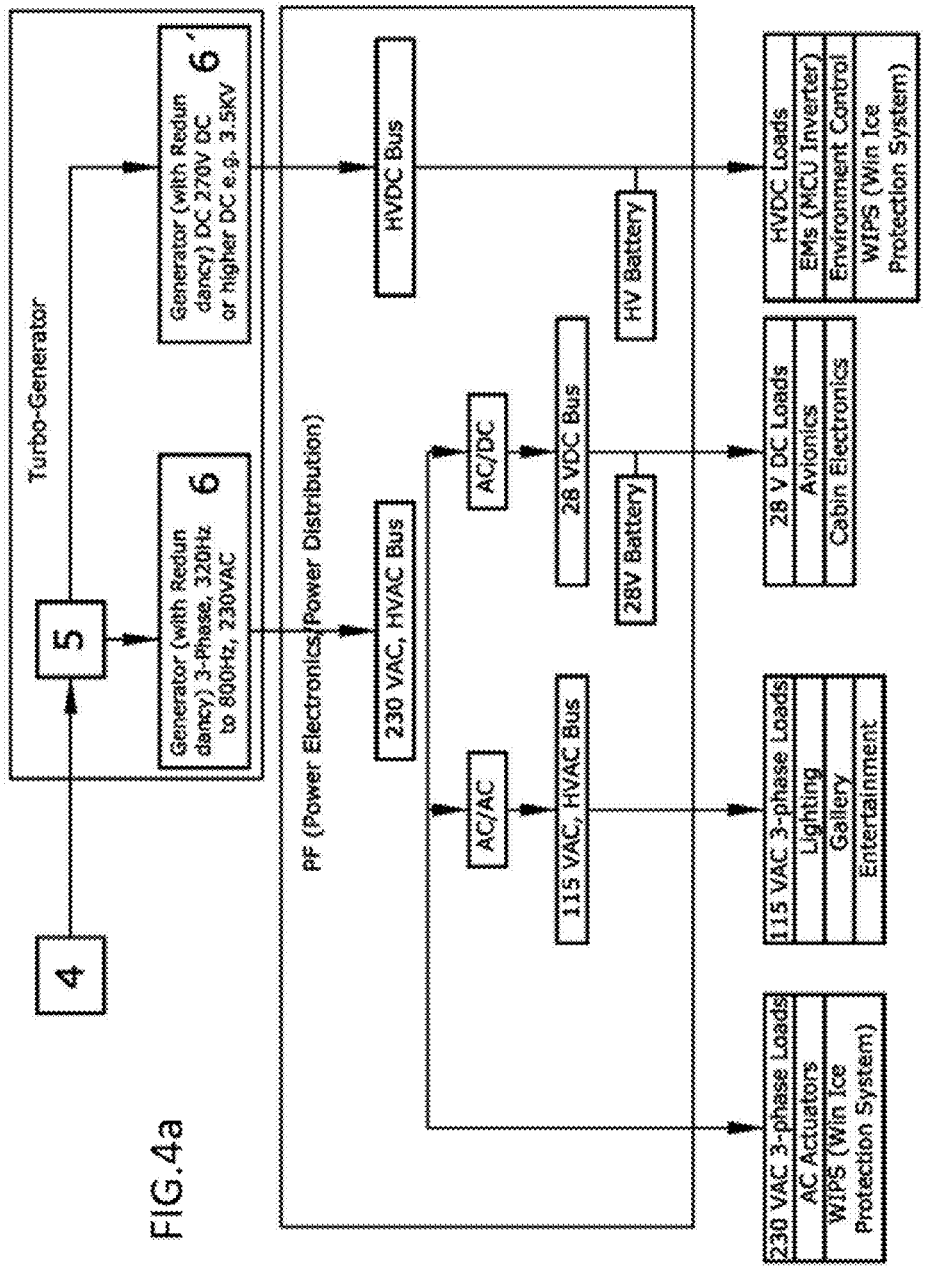

FIG. 4a depicts an embodiment of a power conversion system architecture according to the disclosure.

Current is generated as AC 3-phase current at 230V by the generator(s) (6). As per the power ratings achieved, to ensure full power generation, a number of generator channels are used in parallel. For instance, to generate 1.5 MW using a 250 KVA generators, a number of 6 generator channels will be used. Likewise, to generate 5 MW, a number of 20 generator channels are used.

Alternatively, higher voltage levels (1 kV or higher) may also be used thus further reducing the current requirements and the impact on wiring or number of generator channels.

As mentioned, the energy generated is used to power various electrical loads of the power-demanding systems (also known as aircraft systems or consumers) such as avionics and cabin electronics, environment control and WIPS (Wing Ice Protection System), lighting and entertainment, as well as propulsion e-motors. Part of the energy will also be used to recharge batteries (9). The electrical loads are designed to run at various voltage levels and either AC or DC current, so power conversion systems (8) are necessary in order to accommodate the generated power from the generator(s) (6) to the aircraft standards.

As set forth, the at least one electrical generator (6) is configured to generate electricity at 230 VAC power bus or at DC power bus of at least +/−270 VDC.

Then, the power conversion system comprises at least one power converter configured to convert the generated electricity into at least one of the following voltage buses: 115 VAC, 28 VDC, or +/−270 VDC.

Examples of power converters are:

an AC/AC converter to convert the generated 230 VAC to 115 VAC power bus and supply 115 VAC 3-phase loads of the aircraft systems, an AC/DC converter to convert the generated 230 VAC to 28 VDC power bus and supply 28 VDC loads of the aircraft systems, a DC/DC converter to convert the at least +/−270 VDC to 28 VDC power bus and supply 28 VDC loads of the aircraft systems, a DC/AC converter to convert the at least +/−270 DC to AC power bus for supplying AC loads of the aircraft systems.

Therefore, if the electrical generator (6) generates electricity at 230 VAC power bus (3-phase, from 320 to 800 Hz), the power electronics may supply power directly to the electrical loads suitable at such electrical specifics, or may convert it to another kind of current. As per the figure, actuating motors of the aircraft and Wing Ice Protection Systems (WIPS) may be supplied directly at 230 VAC without power conversion.

If current generated at 230 VAC need to be converted, the following power converters may be used:
- an AC/AC converter to convert the generated 230 VAC to 115 VAC power bus and supply 115 VAC 3-phase loads of the aircraft systems (e.g., lighting, galley and entertainment cabin systems), and/or
- an AC/DC converter to convert the generated 230 VAC to 28 VDC power bus and supply 28 VDC loads of the aircraft systems (e.g., cabin electronics and avionics).

As it can be observed, the 28 VDC bus may be connected to a 28V battery.

Else, if the electrical generator (6) generates electricity at +/−270 VDC power bus (or higher), the power electronics may supply power directly to the electrical loads suitable at such electrical specifics, or may convert it to another kind of current.

If current generated at +/−270 VDC need to be converted, the following power converters may be used:
- a DC/DC converter to convert the at least +/−270 VDC to 28 VDC power bus and supply 28 VDC loads of the aircraft systems (e.g., microcontrollers such as MCU inverters, environment control system (ECS) and Wing Ice Protection Systems (WIPS)),
- a DC/AC converter to convert the at least +/−270 DC to AC power bus for supplying AC loads of the aircraft systems.

As it can be observed, the HV DC bus may be connected to a HV battery(s) which is, preferably, controlled by a BMS (not shown). In this regard, based on the aforementioned architecture of FIG. 4*a*, in FIG. 4*c* it is shown that the HV DC bus connected to a HV battery(s) may also be connected to the electrochemical device (12), more in particular, to the high-temperature fuel-cell (12) system configured to convert chemical energy of primary or secondary fuels into electrical energy for assisting the closed-cycle arrangement on supplying electrical energy to the at least one power-demanding system.

According to this particular embodiment, the fuel-cell (12) system may provide DC power either to the HV battery or directly on to HV DC bus to drive the load via a DCDC converter inside the fuel-cell (12) system. In a more particular embodiment, the fuel-cell (12) system is provided as a backup power system, such that the HV battery(s) is the priority source under normal operating conditions, so that the DC power can be smoothed/filtered by the battery before feeding to at least one of the various electrical loads of the power-demanding systems, such as avionics and cabin electronics, environment control and WIPS (Wing Ice Protection System), lighting and entertainment, as well as electric motors, used preferably to drive the fuel pumps (10.1.1, 10.2.1) or the pumping element (3) of the closed-cycle. The electric motor(s) can also drive a fan and assist aircraft propulsion.

In such particular embodiment, in case the HV battery(s) is not available, the fuel-cell (12) system would be in charge of providing power to the DC bus to drive/assisting loads the aforementioned loads.

The operating mode of such embodiment comprising the HV battery(s) and the fuel-cell (12) system, that is, the switching behavior between them, is controlled by contactors after the DCDC converter in the fuel-cell (12) system.

The power-demanding system may be also a gas turbine engine systems such as ECU.

FIGS. 4*b*1 and 4*b*2

Regarding the aforementioned electric motors, FIGS. 4*b*1 and 4*b*2 show respective particular embodiments based on the power system architecture of FIG. 4*a*, but showing additional electric pump systems as part of the powerplant.

In particular, said electric pump systems comprise pumping elements of the closed cycle (3) or fuel pumps (10.1.1, 10.2.1), embodied as electric pumps, driven by an electric motor fed by the power conversion system.

Said electric motors configured for driving the corresponding electric pumps can be connected to either the AC bus or the DC bus, depending on the motor controller type. Accordingly, each of the FIGS. 4*b*1 and 4*b*2 show a corresponding configuration.

On one hand, in FIG. 4*b*1 the electric motor is connected to the AC bus, and so it's fed by the power conversion system such that current generated at 230 VAC is converted by means of a rectifier, then supplied through a DC link to an inverter which converts the current again to be used by the electric motor.

On the other hand, in FIG. 4*b*2 the electric motor is connected to the DC bus, and so it's fed by the power conversion system such that current generated at +/−270 VDC is converted by means of an inverter to be used by the electric motor.

FIG. 4*c*

Figure 4C:
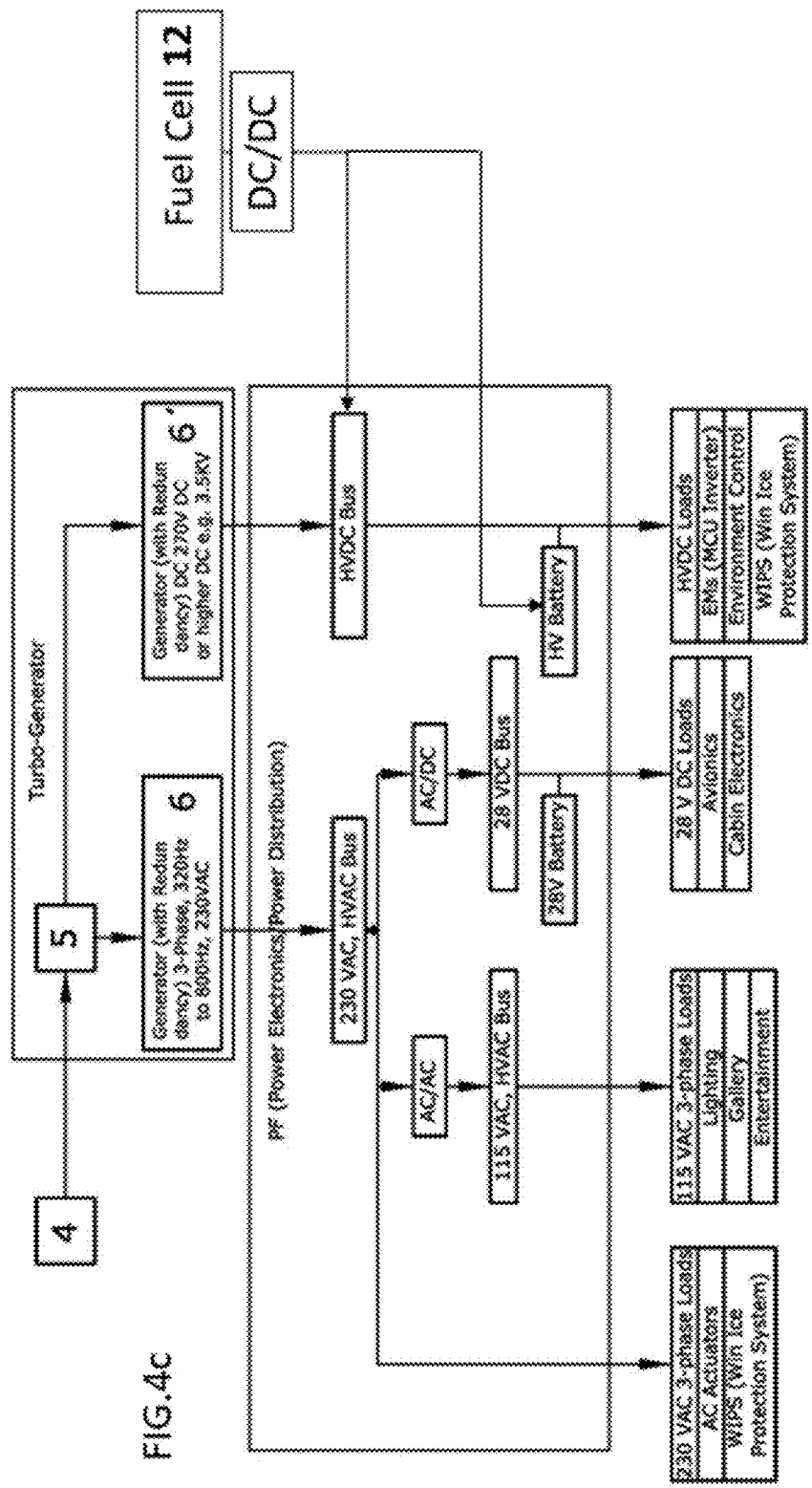

Based on the aforementioned architecture of FIG. 4*a*, in FIG. 4*c* it is shown that the HV DC bus connected to a HV battery(s) may also be connected to the electrochemical device (12), more in particular, to the high-temperature fuel-cell (12) system configured to convert chemical energy of primary or secondary fuels into electrical energy for assisting the closed-cycle arrangement on supplying electrical energy to the at least one power-demanding system.

According to this particular embodiment, the fuel-cell (12) system may provide DC power either to the HV battery or directly on to HV DC bus to drive the load via a DCDC converter inside the fuel-cell (12) system. In a more particular embodiment, the fuel-cell (12) system is provided as a backup power system, such that the HV battery(s) is the priority source under normal operating conditions, so that the DC power can be smoothed/filtered by the battery before feeding to at least one of the various electrical loads of the power-demanding systems, such as avionics and cabin electronics, environment control and WIPS (Wing Ice Protection System), lighting and entertainment, as well as electric motors.

In such particular embodiment, in case the HV battery(s) is not available, the fuel-cell (12) system would be in charge of providing power to the DC bus to drive/assisting loads the aforementioned loads.

The operating mode of such embodiment comprising the HV battery(s) and the fuel-cell (12) system, that is, the switching behavior between them, is controlled by contactors after the DCDC converter in the fuel-cell (12) system.

The power-demanding system may be also a gas turbine engine systems such as ECU.

FIG. 5*a*

Figure 5A:
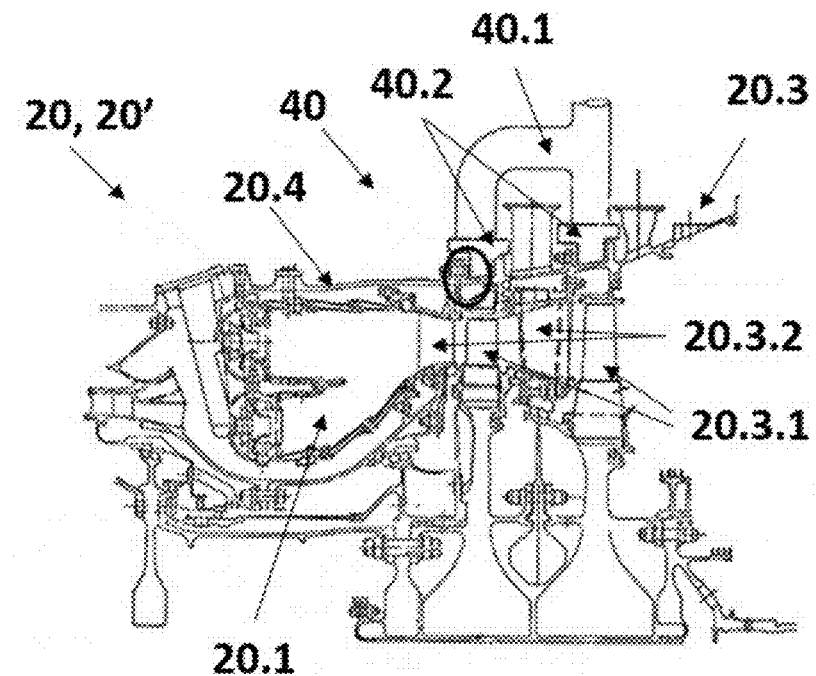
FIGS. 5a-b—These figures show a schematic turbine casing cooling for Tip Clearance Control comparing the known air-based system used in current aero-engines (FIG. 5a) with the new close-cycle-based system (FIGS. 5b,c).
Figure 5B:
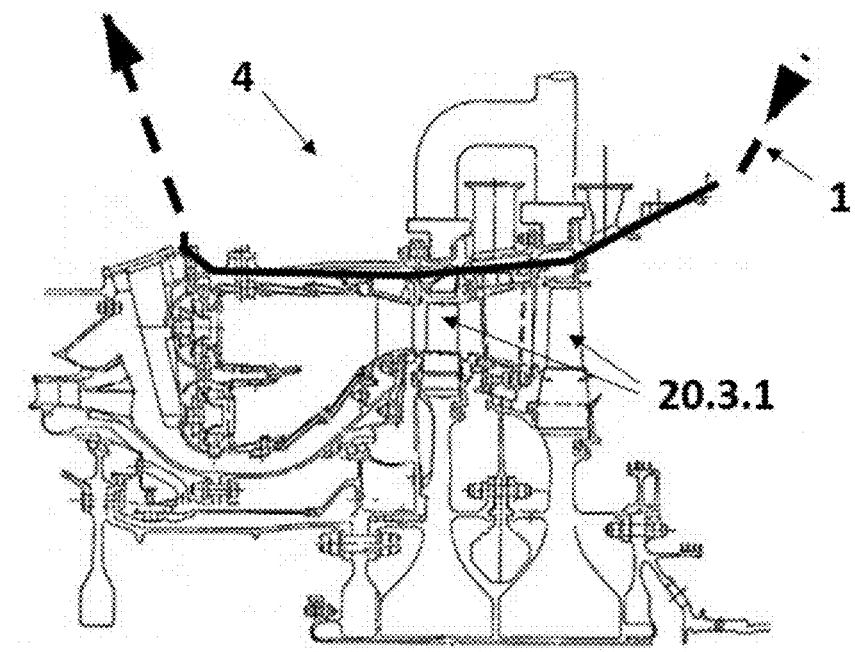
Figure 5C:
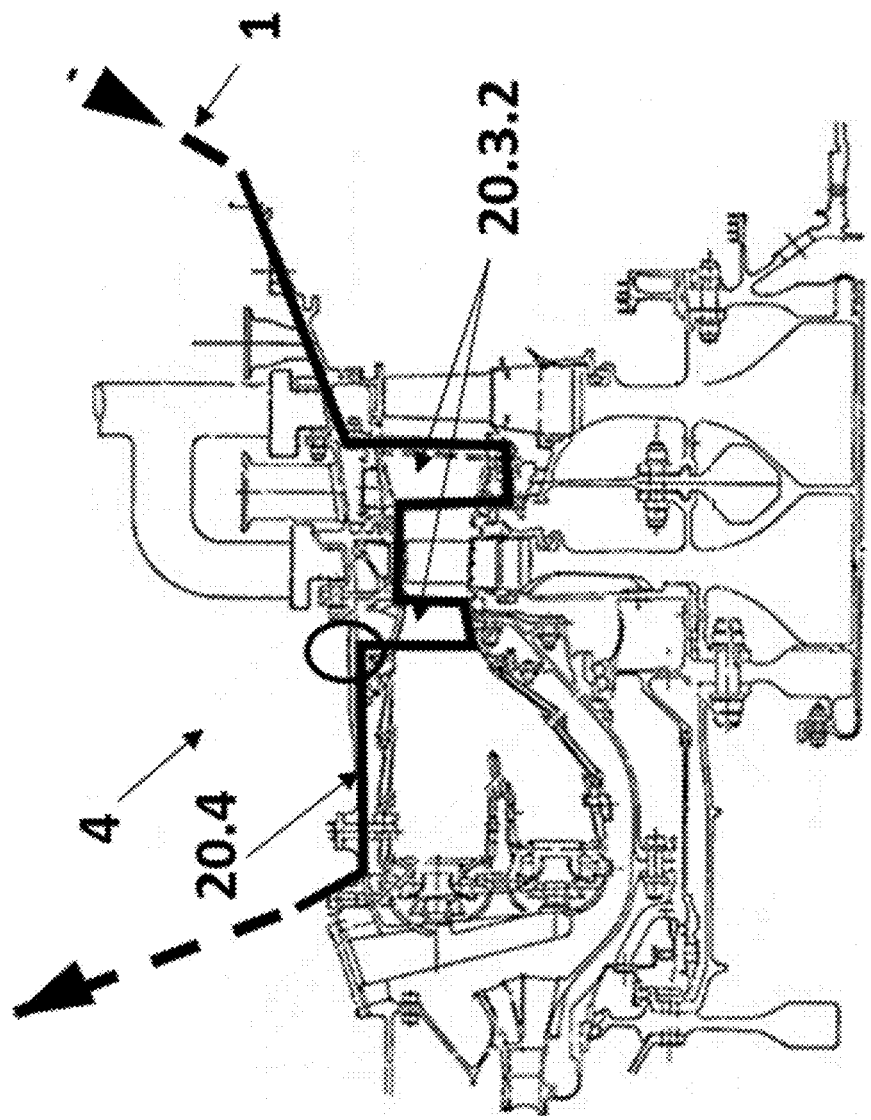

FIG. 5*a* shows the known air-based Tip Clearance Control ('TCC') system used in current aero-engines while FIGS. 5*b* and 5*c* depicts embodiments of the new proposed system based on the close-cycle arrangement described previously.

In FIG. 5*a*, a combustor casing (20.4) and a turbine casing (20.3) are separated by a bolted joint (pointed out with a circle). The turbine casing (20.3) is cooled to maintain a tip clearance objective relatively to the turbine blades (20.3.1). The tip clearance objective is a maximum allowable gap between the casing (20.3) internal surface and the blade tip to be achieved for each phase of the flight cycle. This gap should be as small as possible, to reduce gas leakage and performance loss. On the other hand, clash or large rub between the blade tip and the casing liner—especially during take-off—is to be avoided to prevent components degradation and the creation of a significant groove into the casing (20.3), further increasing the tip gap.

In the conventional air-based arrangement (40), turbine casing (20.3) cooling is done using perforated manifolds (40.2) projecting compressed air to the casings (20.3). Compressed air is fed by the engine fan or compressor (20.2) to a large sheet metal structure and/or pipes (40.1), required to transport large air mass flows, and then directed to the perforated manifolds (40.2).

The cooling air system is an open loop, i.e. the cooling air is not recirculated, and therefore this generates efficiency losses. The system is controlled by large and heavy valves. Due to the limitations of the air based system, only a small casing area just above the blade tip is impinged by the cooling air. This creates a non-uniform axial temperature distribution and a non-uniform longitudinal deflection of the casing (20.3). Further, this system also generates non-uniform blade tip clearances due to the non-uniform circumferential temperature distribution around the casing (20.3) created by different length path of the cooling air from inlet to impingement target and the non-uniform casing (20.3) carcass bending loads occurring during flight manoeuvres (as the casings (20.3, 20.4) are bolted together as a tube and are mounted to the airframe pylons at a 12 O'clock position, the reaction of airframe induced manoeuvres loads by the casings (20.3, 20.4) is non-uniform). Furthermore, this system is prone to generate significant tip clearance variations during the flight profile as the system is difficult to control with significant lags in response time.

FIGS. 5*b* and 5*c*

As seen in FIGS. 5*b* and 5*c*, it is proposed by the disclosure to replace the former air-based tip clearance control system by a system based on the circulation of the closed-cycle working fluid in thermal communication with the gas turbine engine casings (20.3) using one or several heat exchangers. Preferably, serpentines of the circuit (1) are 3D printed on the turbine casing (20.3) external surfaces and possibly combustor casing (20.4) external surface, to form a heat exchanger.

Contrary to the air-based system, the circuit (1) is closed and therefore more efficient. The use of liquid or supercritical fluid allows much higher heat transfer than in the current air based system (40). It also allows the use of small pipes.

As can be seen in FIGS. 5*b* and 5*c* in comparison with FIG. 5*a*, the new system gives a much larger axial coverage of the casing (20.3, 20.4) surface, resulting in a better control of the casing (20.3, 20.4) longitudinal deflections.

The rotors and casing (20.3, 20.4) thermo-mechanical displacements and hence the resulting blade tip gap value can be correlated to engine parameters (shaft speeds, turbine temperatures and pressure) and closed-cycle parameters (mass flow, Pressure, Temperature) by the aid of a performance model of the engine, thermo-mechanical simulation, and empirical data gathered during development tests. Engine and closed-cycle parameters monitoring allows control of the closed-cycle parameters through valves to reach the tip clearance targets for each phase of the cycle. This further improves the performance of the TCC system, as the new closed-loop system is much easier to control and has a much better dynamic response than the previous system.

Finally, as it can be seen in the embodiment shown in FIG. 5*c*, the casing cooling function is combined with the cooling of the turbine nozzle guide vanes (20.3.2). Serpentines are printed on the vanes (20.3.2) internal surfaces to form a heat exchanger. Transition from one component to the other (for example casing to vane (20.3.2) or casing to casing transition) is ensured by flexible element(s) such as small diameter below(s), compensating for thermal relative displacements between these components.

As can be seen in FIGS. 5*b* and 5*c*, the closed-cycle circuit does not impinge onto the turbine gas path. Aerodynamics and gas velocities are not impacted by the new construction preventing compressor (20.2) and transient performance drawbacks (i.e. reduction of the compressor (20.2) surge and stall margins).

For illustrative purposes, FIGS. 5*b* and 5*c* show a single continuous circuit (1) impinging successively a turbine casing (20.3), (turbine vanes (20.3.2) in FIG. 5*c*), and then a combustor casing (20.4) using heat exchanger(s) (4) preferably 3D printed onto the turbine case, (turbine vanes (20.3.2) internal surface in FIG. 5*c*) and combustor casing (20.4). Nevertheless, the skilled person shall recognize that the circuit (1) may be a continuous loop impinging turbine stages and possibly combustor stage in serie (as shown in FIGS. 5*b* and 5*c*), or discontinuous, using discrete parallel sub-branches impinging different engine sections in parallel as explained previously.

FIG. 6*a*

Figure 6A:
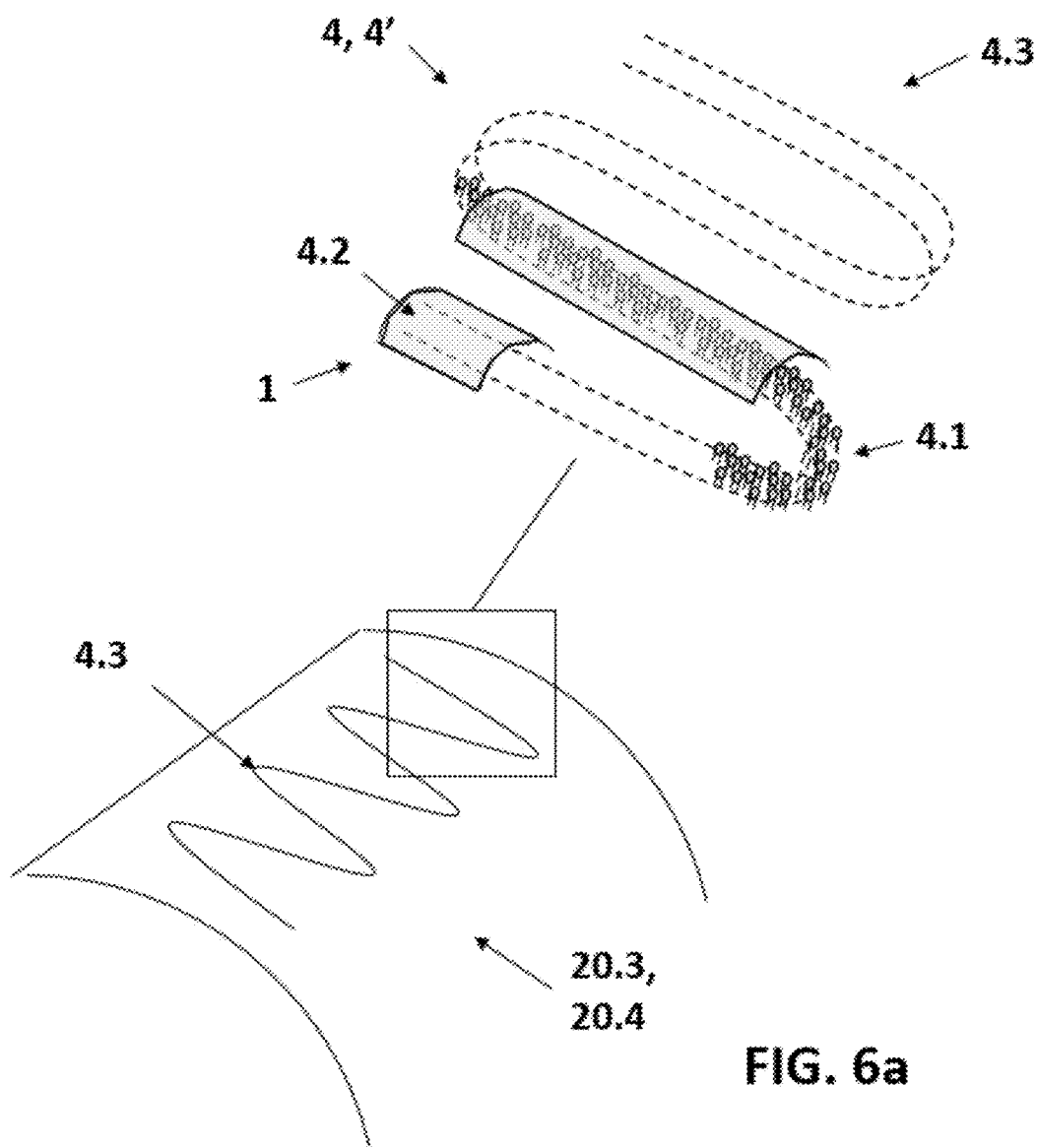
FIGS. 6a-b—These figures show views of a schematic embodiment of a 3D printed heat exchanger onto an engine casing.

FIG. 6*a* shows different views of an embodiment of a primary heat exchanger (4, 4', 4") printed onto a combustor (20.4) or turbine casing (20.3). Combustor (20.4) or turbine (20.3) casings are forged and made from Nickel based alloys, providing high temperature capability, high strength and a low probability of having a material defect. The primary heat exchanger (4, 4', 4") is 3D printed as a serpentine (4.3) to increase the path length of the working fluid onto the casing (20.3, 20.4).

As can be seen, the new system gives a much larger coverage of the casing (20.3, 20.4) surface, resulting in a better control of the casing (20.3, 20.4) deflections.

In an embodiment, the primary heat exchanger (4, 4', 4") is made off a high number of 3D printed discrete features (4.1) increasing the contact area between the working fluid and the casing (20.3, 20.4), hence, increasing the heat exchange between the working fluid and the casing (20.3, 20.4). Finally, a cover (4.2) is also 3D printed to form channels enclosing and sealing the working fluid. In this example, the working fluid typically pickups heat from the hot casing (20.3, 20.4).

Similarly, as mentioned previously, the construction of the heat exchanger shown in FIG. 6*a* can be applied for the construction of a heat exchanger (10.1.2) used for fuel heating before reaching the combustor (20.1) of the gas turbine engines (20, 20').

FIG. 6*b*

Figure 6B:
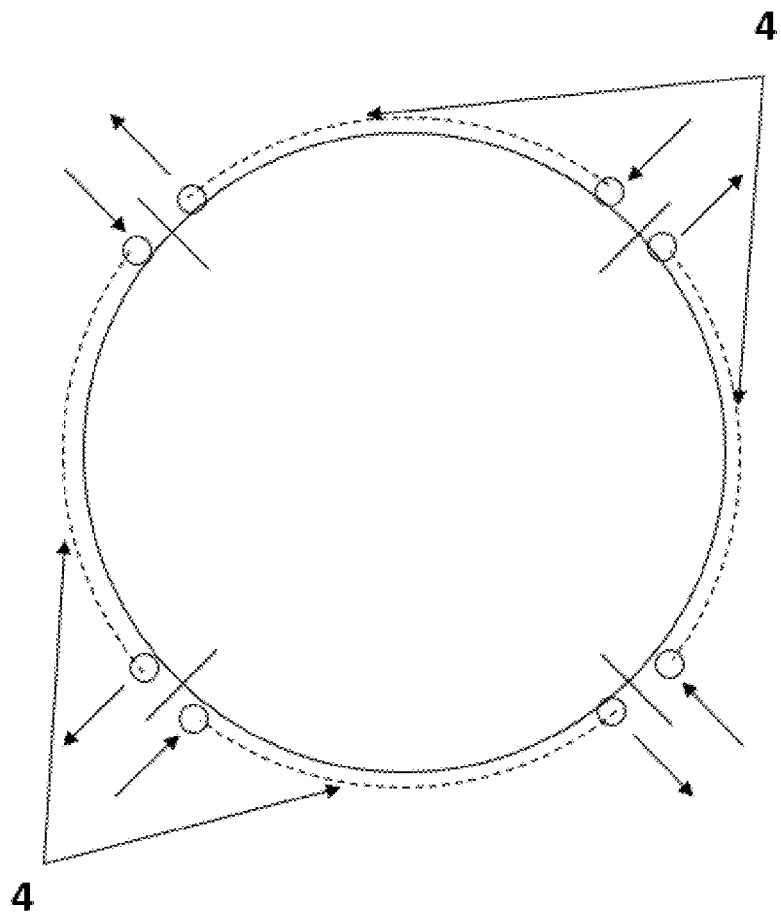

FIG. 6*b* shows 4 off serpentines printed, for instance, on a turbine casing (20.3). Each serpentine is fed by individual parallel sub-branches of the closed-cycle controlled by their own valves and fed by different flow rates of the working fluid of the closed cycle arrangement. This specific arrangement is used to compensate non-uniform circumferential temperatures and carcass loading of a turbine casing (20.3). This results in a more uniform tip clearance along the circumferential direction of the casing (20.3), reducing gas leakages and improving the performance of the turbine.

FIG. 7

Figure 7:
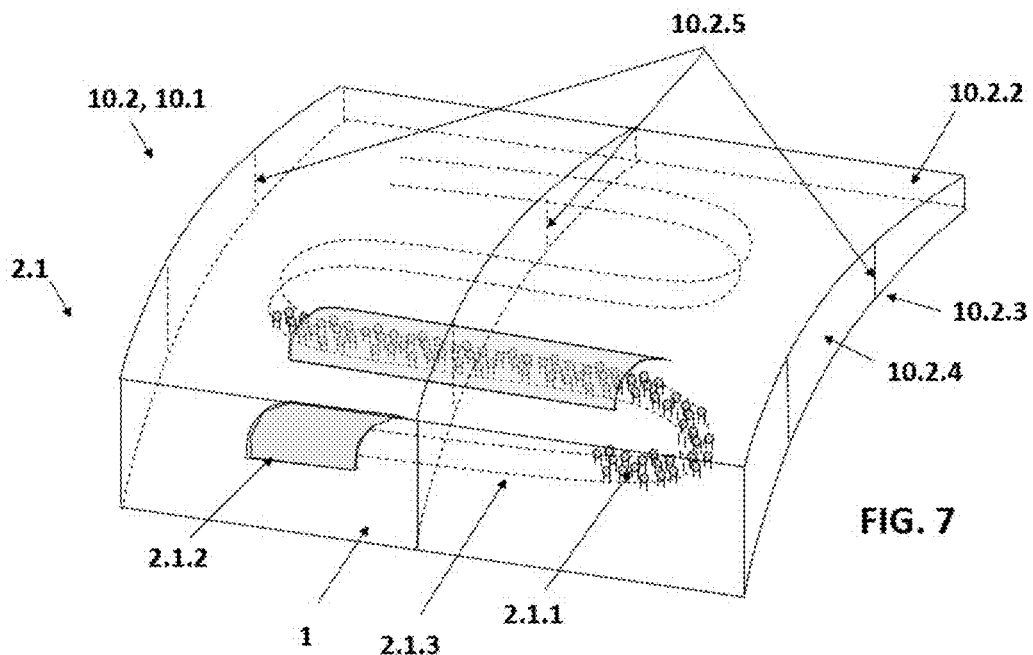
FIG. 7—This figure shows a schematic embodiment of a 3D printed heat exchanger onto a fuel tank, wherein the fuel tank comprises 2 walls with the vacuumed cavity.

FIG. 7 shows a heat exchanger printed onto a fuel tank (10.1, 10.2). The fuel tank has a double wall (10.2.2, 10.2.3) construction forming an interstice (10.2.4) and is vacuumed allowing fuel storage in a liquid form at cryogenic temperatures. The heat exchanger is printed onto the external surface of the fuel tank inner wall (10.2.3). Similarly to FIG. 6, this heat exchanger is 3D printed as a serpentine (2.1.3) using discrete 3D printed features (2.1.1) and a printed cover (2.1.2) to enclose the working fluid.

FIG. 7 also shows support struts (10.2.5) printed on the inner surface (10.2.3) of the fuel tank and acting as supports of the second surface (10.2.2) preventing its buckling under vacuum conditions.

In the case described in FIG. 7, the working fluid is typically cooled by the thermal mass of the fuel tank (10.1, 10.2) and its stored fuel.

FIG. 8

Figure 8:
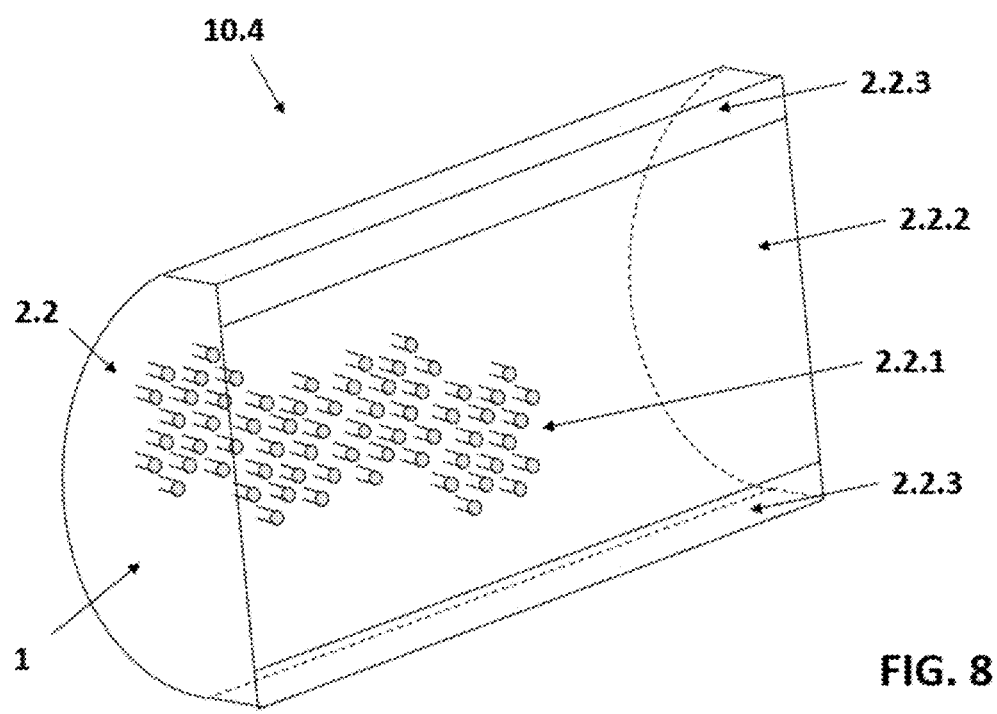
FIG. 8—This figure shows a schematic embodiment of a 3D printed heat exchanger onto a wing leading edge.

FIG. 8 shows a heat exchanger printed onto a wing Leading Edge internal surface (10.4). Similarly to FIGS. 6 and 7, 3D printed discrete features (2.2.1) form the basis of the heat exchanger. In this case, the enclosure is made from a plate (2.2.2) sealed and fixed onto (3D printed) supports (2.2.3).

The heat exchangers shown in FIGS. 7 and 8 can be used as the pre-cooler (2.1, 2.2) of the close cycle arrangement allowing cooling of the working fluid before reaching the main pumping element (3) of the closed-cycle arrangement.

Alternatively, the heat exchanger shown in FIG. 8 can also be used for heating only of an airframe surface, using a sub-branch of the closed cycle extracted from the main cycle by-passing the expanders.

FIG. 9

In FIG. 9, it is depicted a schematic embodiment of an airframe (10) structure partially housing some components of the closed-cycle arrangement in the fuselage undercarriage.

As a way of example, FIG. 9 shows the power conversion system (8) and the ventilation ports (schematically seen in FIG. 1 as points C'), as well as an opening or exposed recess (10.3) providing a large ventilated volume.

Similarly, the recess (10.3) can house other components previously described with specific cooling and/or ventilation requirements such as the heater (11) or the fuel cell (12).

This recess provides an enclosure, which can supports additional insulation material (for example foam). The recess may also allow direct exposure of the components lower surface to ram air. This further improves component ventilation, and possibly reduces the risk of harmful chemical species concentration in a confined area, in case of component damage or leakage. The recess (10.3) maintains good aerodynamical conditions for the fuselage. In further embodiments, this recess (10.3) may be fully or partially covered by belly fairings.

What is claimed is:

1. A powerplant for an aircraft, the powerplant comprising:
    at least two gas turbine engines; and
    at least one closed-cycle arrangement for recuperating heat from the at least two gas turbine engines and supplying power to at least one power-demanding system, wherein the closed-cycle arrangement comprises:
        a closed circuit channeling a working fluid subjected to a thermodynamic cycle;
        at least one pre-cooler configured to transfer heat from the working fluid to a heat sink;
        the heat sink in thermal communication with the pre-cooler, the heat sink being at least one of a fuel tank or an airframe surface;
        at least one pumping element configured to move the working fluid through the closed circuit;
        at least two primary heat exchangers, each one configured to transfer heat from a respective gas turbine engine to the working fluid;
        at least one expanding element configured to drive a gearbox and an output shaft by expansion of the working fluid, wherein the output shaft driven by the expanding element is connected to at least one electrical generator configured to generate electrical power; and
    a power conversion system configured to receive the generated electrical power by the electrical generator and to accommodate and supply it to the at least one power-demanding system,
    wherein the closed-cycle arrangement is configured to be partially housed within an airframe structure of the aircraft, so that at least the pumping element, the expanding element, the electrical generator, and the power conversion system are housed in said airframe structure.

2. The powerplant according to claim 1, at least one of:
    wherein the gas turbine engines comprise a cooling system of turbine sections of the gas turbine engines, whose configuration is based on the working fluid and consumes less than 5% of compressor entry gas mass flow for cooling of 1st stage and 2nd stage turbine vanes and casings; or
    wherein said gas turbine engines have a power offtake system, whose configuration is based on closed-cycle power offtake with less than 50% of total engine power offtake extracted from gas turbine engine shafts of the gas turbine engines.

3. The powerplant according to claim 1, wherein the closed circuit separates, upstream of a gas turbine engine into a plurality of sub-branches before different sections of at least one of a combustor, a turbine, or an exhaust of the gas turbine engine, and wherein each of the plurality of sub-branches comprises control valves for regulating flow-rate of the working fluid in each branch, said control valves being controlled as a function of gas turbine engine core parameters comprising pressure and temperature, at different sections, information relating to pressure and temperature being provided by corresponding sensors of the gas turbine engines.

4. The powerplant according to claim 3, wherein at least one of the sub-branches of the closed circuit bypass the expanding element and reconnect the closed circuit upstream of the pre-cooler.

5. The powerplant according to claim 1, wherein the powerplant is configured to distribute at least two fuel systems, a primary fuel system and at least a secondary fuel system, the secondary fuel system being based either on a fuel type having a lower carbon content than the fuel type of the primary fuel system or on additives, wherein the heat sink in thermal communication with the pre-cooler is fuel tank comprising primary or secondary fuel stored at cryogenic temperature.

6. The powerplant according to claim 5, wherein at least one of the primary fuel system or the secondary fuel system is configured to supply at least one of a liquid methane based fuel, liquefied hydrogen, or additives to at least one of the gas turbine engines, wherein at least one of fuels mixtures or additives can be supplied to at least one of the gas turbine engines as a function of flight profile parameters, the flight profile parameters comprising air pressure and temperature, information relating to air pressure and temperature being provided by corresponding sensors of the aircraft.

7. The powerplant according to claim 5, wherein one of the primary fuel system or the secondary fuel system comprises at least one of:
   a high-pressure pump configured to pressurize and vaporize fuel at least at 300 bar; or
   a channel in thermal communication with at least one of a combustor section or a turbine section of a gas turbine engine of the at least two gas turbine engines by at least one heat fuel exchanger so that heat is transferred from the respective gas turbine engine to the fuel for heating and vaporization of the fuel.

8. The powerplant according to claim 1, wherein the closed-cycle arrangement further comprises a boosting system configured to add power to the thermodynamic cycle by at least one of:
   a heater positioned upstream of the expanding element;
   additional compressors or pumping elements with interstage cooling between two compressors or pumping elements; or
   a condenser positioned downstream of the expanding element.

9. The powerplant according to claim 8, wherein the boosting system comprises the heater, the heater configured to heat the working fluid by burning least one of Liquid hydrogen or a Liquid methane based fuel, and wherein the heater is housed in a section of the airframe structure.

10. The powerplant according to claim 1, wherein the powerplant further comprises an electrochemical device comprising a high-temperature fuel-cell configured to convert chemical energy of fuel into electrical energy for assisting the closed-cycle arrangement on supplying electrical energy to the at least one power-demanding system, wherein said electrochemical device is configured to be fed by high temperature compressed air bleed out from at least one gas turbine engine compressor.

11. The powerplant according to claim 10, wherein the electrochemical device is configured to receive and use secondary fuel comprising a liquefied methane based fuel.

12. The powerplant according to claim 10, wherein the electrochemical device is connected to at least a high voltage battery via a DCDC converter inside the electrochemical device by means of a HV DC bus.

13. The powerplant according to claim 10, wherein the gas turbine engines comprise a Turbine Blade Tip Clearance Control system based on the working fluid of the closed-cycle arrangement impinging at least one casing of a gas turbine engine and tip clearance objectives of turbine section parameters comprising at least one of pressure, temperature, or shaft speed, monitored by sensors.

14. The powerplant according to claim 13, wherein the closed-cycle arrangement is configured for controlling Turbine Blade Tip Clearance by impinging at least one casing of a gas turbine engine of the at least two gas turbine engines, in combination with cooling of vanes internal surfaces.

15. The powerplant according to claim 1, wherein the gas turbine engines, a heater of a boosting system configured to add power to the thermodynamic cycle, an electrochemical device of the powerplant use a same methane based fuel, with the methane based fuel being also used as the working fluid of the closed-cycle arrangement.

16. The powerplant according to claim 1, wherein thermal management of least one of the power conversion system or electrochemical device are based on least one of closed-cycle derived sub-lines, gas turbine engines bleed, or ram air.

17. The powerplant according to claim 1, wherein the at least one electrical generator is configured to generate electricity at least one of at 230 VAC power bus or at DC power bus of at least +/−270 VDC.

18. The powerplant according to claim 17, wherein the power conversion system comprises at least one power converter configured to convert the generated electricity into at least one of the following voltage buses: 115 VAC, +/−270 VDC, or 28 VDC.

19. The powerplant according to claim 18, wherein at least one power converter is:
   an AC/AC converter to convert the generated 230 VAC to 115 VAC power bus and supply 115 VAC 3-phase loads of aircraft systems of the aircraft;
   an AC/DC converter to convert the generated 230 VAC to 28 VDC power bus and supply 28 VDC loads of the aircraft systems;
   a DC/DC converter to convert the converted +/−270 VDC to 28 VDC power bus and supply 28 VDC loads of the aircraft systems; or
   a DC/AC converter to convert the converted +/−270 DC to AC power bus for supplying AC loads of the aircraft systems.

20. The powerplant according to claim 18, wherein the powerplant further comprises energy storage means, the energy storage means being at least one of a low voltage battery, a high voltage battery, or a flywheel.

21. The powerplant according to claim 20, wherein the energy storage means is at least one battery, and wherein the powerplant further comprises a battery management system (BMS) configured to control operation of the at least one battery for the at least one battery to at least one of store excess energy or smooth output of the power bus under transient loads and load fluctuations.

22. The powerplant according to claim 1, wherein the powerplant further comprises at least one protective device for stopping power generation from the output shaft of the expanding element, wherein said protective device is at least one of:
   a clutch for decoupling the output shaft to the at least one electrical generator;
   switches or shutting-off devices configured to control or stop the power supplying to the power-demanding system; or
   switches or shutting-off devices operable by a battery management system (BMS) to stop current toward at least one battery when fully charged.

23. The powerplant according to claim 1, wherein the power-demanding system is at least one of:
   electrical motors;
   Wing Ice Protection Systems (WIPS) to be supplied at 230 VAC or +/−270 DC;
   actuating motors of the aircraft to be supplied at 230 VAC;
   lighting, galley and entertainment cabin systems to be supplied at 115 VAC;
   cabin electronics and avionics to be supplied at 28 VDC;
   environment control system (ECS) to be supplied at +/−270 DC; or
   microcontrollers comprising MCU inverters to be supplied at +/−270 DC.

24. The powerplant according to claim 23 wherein the power-demanding system is at least one electrical motor, wherein the electrical motor is connected:

to an AC bus, the electrical motor being fed such that current generated at 230 VAC is converted by means of a rectifier, supplied through a DC link to an inverter, where the current is converted again to be used by the electrical motor; or to a DC bus, the electrical motor being fed such that current generated at +/− 270 VDC is converted by an inverter to be used by the electrical motor.

25. The powerplant according to claim 23, wherein the electrical motor is driving the pumping element of least one of the closed-cycle arrangement or the fuel pump of a primary fuel system or a secondary fuel system.

26. The powerplant according to claim 1, wherein the output shaft is connected to six 250 KVA electrical generators generating current at at least one of 230 VAC power bus or DC power bus of at least +/− 270 VDC.

27. The powerplant according to claim 1, wherein at least one of a primary heat exchanger of the closed-cycle arrangement or a fuel system heat exchanger is 3D printed onto least one of a respective turbine casing, a respective combustor casing, or an exhaust nozzle, the at least one of the primary heat exchanger of the closed-cycle arrangement or the fuel system heat exchanger being a 3D printed arrangement comprising discrete 3D printed features and arranged as a serpentine and comprising a 3D printed cover for enclosure of the working fluid.

28. The powerplant according to claim 27, wherein the at least one of the primary heat exchanger of the closed-cycle arrangement or the fuel system heat exchanger is 3D printed onto the respective turbine casing, wherein several serpentines are 3D printed using discrete 3D printed features, and wherein the serpentines are disposed:
along a longitudinal direction of the respective turbine casing; and
at different angular sectors of the respective turbine casing with the working fluid being fed at a different flow rate in each individual serpentine.

29. The powerplant according to claim 1, wherein at least one of:
a fuel heat exchanger is a pre-cooler that is 3D printed onto the fuel tank using discrete 3D printed features; or
an airframe structure comprising a wing leading edge is formed using discrete 3D printed features,
said 3D printed features being arranged as a serpentine.

30. The powerplant according to claim 29, wherein the fuel tank comprises two separated walls forming an interstice which is vacuum evacuated, wherein the fuel tank further comprises reinforcing 3D printed struts configured for preventing collapse of the two seperate walls.

31. The powerplant according to claim 1,
wherein the expanding element is a turbine and the pumping element is a pump or a compressor, with the turbine mechanically coupled with the pump or the compressor through a common shaft forming a turbo-pump or a turbo-compressor thereby;
wherein the turbo-pump or the turbo-compressor is manufactured by 3D printing comprising printing with a Nickel-based alloy; and
wherein the turbo-pump or the turbo-compressor comprises printed cooling passages for being cooled down at least one of by water or by the working fluid.

32. The powerplant according to claim 1, wherein the working fluid of the closed-cycle arrangement is circulated in pipes made out of a Nickel-based alloy with or without an insulation layer comprising ceramic tape.

33. An airframe structure of an aircraft comprising the powerplant according to claim 1, wherein the airframe structure comprises ventilation ports and an exposed recess defining a large ventilated volume, wherein the exposed recess is configured to house at least one of a heater, an electrochemical device, or the power conversion system, and wherein the exposed recess is configured for allowing direct exposure of components housed within to ram air.

* * * * *

UNITED STATES PATENT AND TRADEMARK OFFICE
CERTIFICATE OF CORRECTION

PATENT NO. : 11,828,227 B2
APPLICATION NO. : 17/654985
DATED : November 28, 2023
INVENTOR(S) : Quentin Luc Balandier et al.

It is certified that error appears in the above-identified patent and that said Letters Patent is hereby corrected as shown below:

In the Specification

In Column 3, Line 15, delete "serie" and insert --series--.

In Column 7, Line 13, delete "Pt" and insert --1$^{st}$--.

In Column 19, Line 18, delete "fuel" and insert --fuel.--.

In Column 26, Line 26, delete "serie" and insert --series--.

In the Claims

In Column 28, Claim 3, Line 38, after "engine" insert --of the at least two gas turbine engines,--.

In Column 28, Claim 3, Line 39, after "before" insert --impinging--.

In Column 28, Claim 5, Line 59, after "is" insert --the--.

In Column 29, Claim 8, Line 22, after "or" insert --two--.

In Column 32, Claim 30, Line 12 (approx.), delete "seperate" and insert --separated--.

Signed and Sealed this
Second Day of July, 2024

Katherine Kelly Vidal
*Director of the United States Patent and Trademark Office*